US008072328B2

(12) United States Patent
Ando et al.

(10) Patent No.: US 8,072,328 B2
(45) Date of Patent: Dec. 6, 2011

(54) TAG COMMUNICATION APPARATUS AND TAG COMMUNICATION SYSTEM

(75) Inventors: Koji Ando, Shiga (JP); Takehiro Kawai, Kyoto (JP)

(73) Assignee: Omron Corporation, Kyoto (JP)

( * ) Notice: Subject to any disclaimer, the term of this patent is extended or adjusted under 35 U.S.C. 154(b) by 940 days.

(21) Appl. No.: 12/042,847

(22) Filed: Mar. 5, 2008

(65) Prior Publication Data
US 2008/0224828 A1    Sep. 18, 2008

(30) Foreign Application Priority Data

Mar. 5, 2007 (JP) .............................. P.2007-054555

(51) Int. Cl.
*G08B 13/14* (2006.01)
(52) U.S. Cl. ................. 340/572.1; 340/572.7; 340/10.2; 455/562.1
(58) Field of Classification Search ............... 340/572.1, 340/572.7, 10.2, 10.4, 3.2–3.24, 3.6–3.63, 340/825.2; 455/456.1, 562.1; 342/90, 91, 342/93, 121, 146, 156, 383, 456
See application file for complete search history.

(56) References Cited

U.S. PATENT DOCUMENTS

| | | | | |
|---|---|---|---|---|
| 5,227,803 A * | 7/1993 | O'Connor et al. | ............ | 342/442 |
| 6,522,898 B1 * | 2/2003 | Kohno et al. | ............... | 455/562.1 |
| 6,922,173 B2 * | 7/2005 | Anderson | ..................... | 343/701 |
| 7,142,120 B2 * | 11/2006 | Charych et al. | ............ | 340/572.4 |
| 7,212,120 B2 * | 5/2007 | Gudat | ......................... | 340/572.1 |
| 7,388,499 B2 * | 6/2008 | Hayashi et al. | ............. | 340/572.7 |
| 7,398,098 B2 * | 7/2008 | Nakao | ............................ | 455/522 |
| 7,573,389 B2 * | 8/2009 | Kiyohara | ................... | 340/572.7 |
| 7,574,269 B2 * | 8/2009 | Cenedese et al. | ............... | 700/17 |
| 7,724,140 B2 * | 5/2010 | Saito et al. | ................. | 340/572.7 |
| 2007/0120650 A1 * | 5/2007 | Nagai et al. | .................. | 340/10.2 |

FOREIGN PATENT DOCUMENTS

| | | |
|---|---|---|
| EP | 1 610 258 A1 | 12/2005 |
| EP | 1 612 579 A2 | 1/2006 |
| EP | 1 746 737 A1 | 1/2007 |
| JP | 2005-328252 | 11/2005 |
| JP | 2005-345198 | 12/2005 |
| JP | 2006-20083 | 1/2006 |

* cited by examiner

*Primary Examiner* — Benjamin C Lee
*Assistant Examiner* — Peter Mehravari
(74) *Attorney, Agent, or Firm* — Dickstein Shapiro LLP

(57) ABSTRACT

A first tag communication apparatus is adapted to perform radio communications with a second tag communication apparatus and an RFID tag provided on a moving object. A controller is operable to cause an antenna to transmit first radio waves while changing a first direction that the first radio waves are transmitted. A receiver is operable to receive a second radio waves transmitted from the second tag communication apparatus. An extractor is operable to extract, from the second radio waves, synchronizing information indicative of a timing that the second tag communication apparatus changes a second direction that the second radio waves are transmitted therefrom. A synchronizer is operable to synchronize a timing that the controller changes the first direction with the timing that the second tag communication apparatus changes the second direction, based on the synchronizing information.

6 Claims, 16 Drawing Sheets

| TABLE No. | SCAN ANGLE |
|---|---|
| 0 | +20° |
| 1 | −40° |

TAG COMMUNICATION APPARATUS AND TAG COMMUNICATION SYSTEM

BACKGROUND

The present invention relates to a tag communication apparatus and a tag communication system capable of performing an RFID tag and wireless communication in cooperation with a different tag communication apparatus while scanning a beam of transmission radio waves.

In recent years, in order to manage the load, there has been used a technique for attaching an RFID (Radio Frequency Identification) tag to an article by performing a wireless communication between the RFID tag and a reader/writer. For example, when the reader/writer is installed at a carry-in entrance such as a dock door, data such as an ID (identification) is automatically read from the RFID tag attached to the article which is being carried, thereby improving efficiency of a distribution management.

At present, as a frequency band for an RFID tag, there are a 13.56 MHz band, a so-called UHF band approximately from 800 MHz to 960 MHz, a 2.45 GHz band, etc. A radio wave of the UHF band has directivity higher than that of 2.45 GHz band. In addition, the radio wave of the UHF band can be extended by a communication distance of about several tens centimeters to several meters more than the radio wave of the 13.56 MHz band. Therefore, the radio wave of the UHF band has been widely used in a distribution industry or the like in that a communication area is relatively larger at the time of using the radio wave of the UHF band.

In contrast, a problem arises in that too many RFID tags would be installed in the communication area because the communication area is larger at the time of using the radio wave of the UHF band. Accordingly, various methods of restricting the communication area within a specific area have been suggested.

For example, as one of the methods, a method of performing communication by use of the RFID reader/writer disclosed in Japanese Patent Publication No. 2006-20083A is exemplified. This RFID reader/writer is configured so as to scan a beam of a radio wave transmitted from a phased array antenna. When the RFID reader/writer is installed at one of the right and left sides of the dock door, it is possible to cover a communication area in which there is no region where communication is not possible.

However, scanning is not possible, for example, when an object through which a radio wave cannot pass is provided with a carrying article and the RFID tag is attached on a side opposite the side scanned by the RFID reader/writer in a state that the RFID reader/writer has been installed at only one of the right and left sides of the dock door.

Accordingly, in order to prevent such reading failure, the inventors have tried wireless communication with the RFID tag by installing two RFID reader/writers at both the right and left sides of the dock door so as to oppose each other.

These RFID reader/writers can be configured so as to scan the beam of the radio wave in the conveyance direction of the articles. With such a configuration, if the RFID reader/writers are installed in the dock door, it is possible to detect movement of the article which is being carried in, the article which is being carried out, or the article which is stopped, for example. Moreover, if the RFID reader/writers are installed at both the right and left sides of the dock door, it is possible to read the RFID tag even in a case where an object through which the radio wave cannot penetrate is provided with the article.

However, since the width of a general dock door is in the range from 3 to 5 m, a distance between antennas of the two opposed RFID reader/writers also becomes 3 to 5 m. If the two RFID reader/writers are installed in this way, there is a possibility that scan timing between the RFID reader/writers is not synchronized. That is, if both the RFID reader/writers simultaneously radiate a radio wave, tag confusion may be generated. Moreover, when the RFID reader/writers are installed close to each other, the radio wave of one of the opposed RFID reader/writers enters into the receiver of the other one of the opposed RFID reader/writers. Accordingly, each receiver may become saturated, so that a weak signal of the RFID tag may not be demodulated. In this case, the generation of the saturation can be prevented by lowering the gain of each receiver of the own RFID reader/writers. However, since the signal from the RFID tag is weak, the signal from the RFID tag may not be demodulated. In order to accurately demodulate the signal of the RFID tag, a distance between the opposed RFID reader/writers has to be 10 m or more.

Accordingly, in order to prevent the tag confusion from being generated, the two RFID reader/writers have to be synchronized with each other. Here, as a method of making the synchronization, a method of connecting the two RFID reader/writers through a cable any making the synchronization can be taken into consideration. However, if the cable is used to connect the opposed RFID reader/writers to each other by use of such a synchronization method, the cable has to be installed. In this case, not only additional cost for installing the cable is necessary, but also the installation of the cable may be difficult in the dock door.

Moreover, since the RFID reader/writers are connected to a server via a network in many cases, a method of making the synchronization by the server can be also taken into consideration. However, such a method of making the synchronization by use of the server has a problem that load of the server becomes increased in a case where the number of the RFID reader/writers becomes increased.

SUMMARY

It is therefore one advantageous aspect of the invention to provide a tag communication apparatus and a tag communication system capable of making synchronization of scan timing between different tag communication apparatuses in a case where a tag communication apparatus performs wireless communication with an RFID tag in cooperation with a different tag communication apparatus while scanning a beam of a transmission radio wave.

It is also one advantageous aspect of the invention to provide a tag communication system capable of detecting movement of an RFID tag while making synchronization between the tag communication apparatuses.

According to one aspect of the invention, there is provided a first tag communication apparatus, adapted to perform radio communications with a second tag communication apparatus and an RFID tag provided on a moving object, the first tag communication apparatus comprising:

an antenna;

a controller, operable to cause the antenna to transmit first radio waves while changing a first direction that the first radio waves are transmitted;

a receiver, operable to receive a second radio waves transmitted from the second tag communication apparatus;

an extractor, operable to extract, from the second radio waves, synchronizing information indicative of a timing that the second tag communication apparatus changes a second direction that the second radio waves are transmitted therefrom; and a synchronizer, operable to synchronize a timing that the controller changes the first direction with the timing that the second tag communication apparatus changes the second direction, based on the synchronizing information.

The "antenna" is formed of a phased array antenna capable of scanning a beam of radio waves transmitted by electrical control at a high speed, for example. In addition, the antenna may include a plurality of antenna elements, a plurality of phase shifters each connected to the plurality of antenna elements, and one distributor/compositor connected to all the plurality of phase shifters. The radio wave input to the distributor/compositor is distributed to each of the phase shifters of the antenna elements, each of the phase shifters changes the radio wave into a desired phase, and then the changed radio wave is radiated through each of the antenna elements. At this time, the radio wave is strongly radiated in a direction in which the radio wave after the phase is changed has the same phase, that is, in a direction in which the phases of the sine wave are equal. The strongest radio wave is the "beam of the transmission radio wave" defined in this specification such as main robe. The direction can be arbitrarily changed by setting the phase shifter.

The "scan angle" in this specification refers to an angle indicating a radiation direction of a beam when the antenna scans the beam of the transmission radio wave. For example, when a phased array antenna in which a plurality of antenna elements are arrayed is used as the antenna, the scan angle is an angle of the beam inclined from a broadside direction.

The plurality of antenna elements may be configured as a patch antenna. Moreover, when the plurality of antennas are configured by using the patch antenna, it is possible to manufacture the thin scan antenna and to making manufacturing cost lower.

As the "RFID tag", a passive type RFID tag which does not include a power source such as a battery and of which a circuit is operated by electrical power transmitted as the radio wave from a reader/writer to perform the wireless communication with the reader/writer is exemplified. In addition, as the "RFID tag", an active type RFID tag which includes the power source such as the battery is also exemplified.

The "tag communication apparatus" refers to a reader/writer, a reader, or a writer capable of performing communication with the RFID tag.

The first tag communication apparatus is configured to be synchronized with the second tag communication apparatus to perform the wireless communication with the RFID tag. For example, when the first tag communication apparatus is opposed to the second tag communication apparatus and performs the wireless communication with the RFID tag while performing scanning, there is a possibility that scan timing is not synchronized, thereby generating radio disturbance or tag confusion. In order to solve this problem, the scan timing of the first tag communication apparatus is synchronized with the scan timing of the second tag communication apparatus. Moreover, it is possible to prevent the radio disturbance, the tag confusion, or the like from being generated. In this case, the first tag communication apparatus may be placed just in front of the second tag communication apparatus. Moreover, the first tag communication apparatus may be opposed so as to be deviated slightly in the right or left side from the front of the second tag communication apparatus. In a case where each of the reader/writers and the antenna are integrated, it means that the reader/writers oppose each other. However, in a case where each of the reader/writers and the antenna are connected to each other through a cable, it means that the antennas oppose each other.

The extractor may be operable to extract the synchronizing information from a reception level of the second radio waves. The extractor may be operable to extract the synchronizing information from a temporal variation of the reception level of the second radio waves. The extractor may be operable to extract the synchronizing information from data transmitted from the second tag communication apparatus.

With the above configurations, it is possible to appropriately perform wireless communications with the RFID tag while avoiding tag confusion.

The receiver may be operable to receive a tag information transmitted from the RFID tag in response to the first radio waves transmitted from the antenna. The first tag communication apparatus may further comprise:

a generator, operable to associate the tag information with temporal information indicative of when the receiver receives the tag information, and to generate a plurality of data sets including the temporal information and angle information which is indicative of the direction that the first radio waves are transmitted when the receiver receives the tag information; and an estimator, operable to perform linear approximation with respect to a relationship between the temporal information and the angle information, and to estimate a direction that the moving object moves from a gradient of a line obtained by the linear approximation.

With the above configurations, it is possible to prevent the reading failure discussed in the background section and detect the movement of the RFID tag while avoiding the tag confusion, thereby improving detection accuracy of the movement of the RFID tag.

According to one aspect of the invention, there is provided a tag communication system, adapted to perform radio communications with an RFID tag provided on a moving object, the tag communication system comprising:

a pair of tag communication apparatuses, disposed so as to oppose each other, each of which is adapted to perform radio communications with the RFID tag and comprises:
  an antenna;
  a controller, operable to cause the antenna to transmit radio waves while changing a direction that the radio waves are transmitted;
  a receiver, operable to receive a tag information transmitted from the RFID tag in response to the radio waves transmitted from the antenna;
  a generator, operable to associate the tag information with temporal information indicative of when the receiver receives the tag information, and to generate a plurality of data sets including the temporal information and angle information which is indicative of the direction that the radio waves are transmitted when the receiver receives the tag information; and
  an estimator, operable to perform linear approximation with respect to a relationship between the temporal information and the angle information, and to estimate a direction that the moving object moves from a gradient of a line obtained by the linear approximation.

Examples of the "moving object" include an article or an article conveyed by a moving apparatus such as a forklift, and a person, an animal, or the like which can move by itself.

DETAILED DESCRIPTION OF EXEMPLARY EMBODIMENTS

Exemplary embodiments of the invention will be described below in detail with reference to the accompanying drawings. In the following description, a method of making synchronization will be described in three embodiments. In the first embodiment, reception levels of a radio wave received from an away station (a different tag communication apparatus) are used to make synchronization. In the second embodiment, a temporal variation in the reception levels of the radio wave received from the away station is used to make synchronization. In the third embodiment, data transmitted from the away station is used to make synchronization. In addition, when the synchronization is made, a method of detecting a moving article (a moving object) will be described according to a fourth embodiment. Issues common to all the embodiments will be described once, and issues specific to each embodiment will be individually described in detail.

Figure 1:
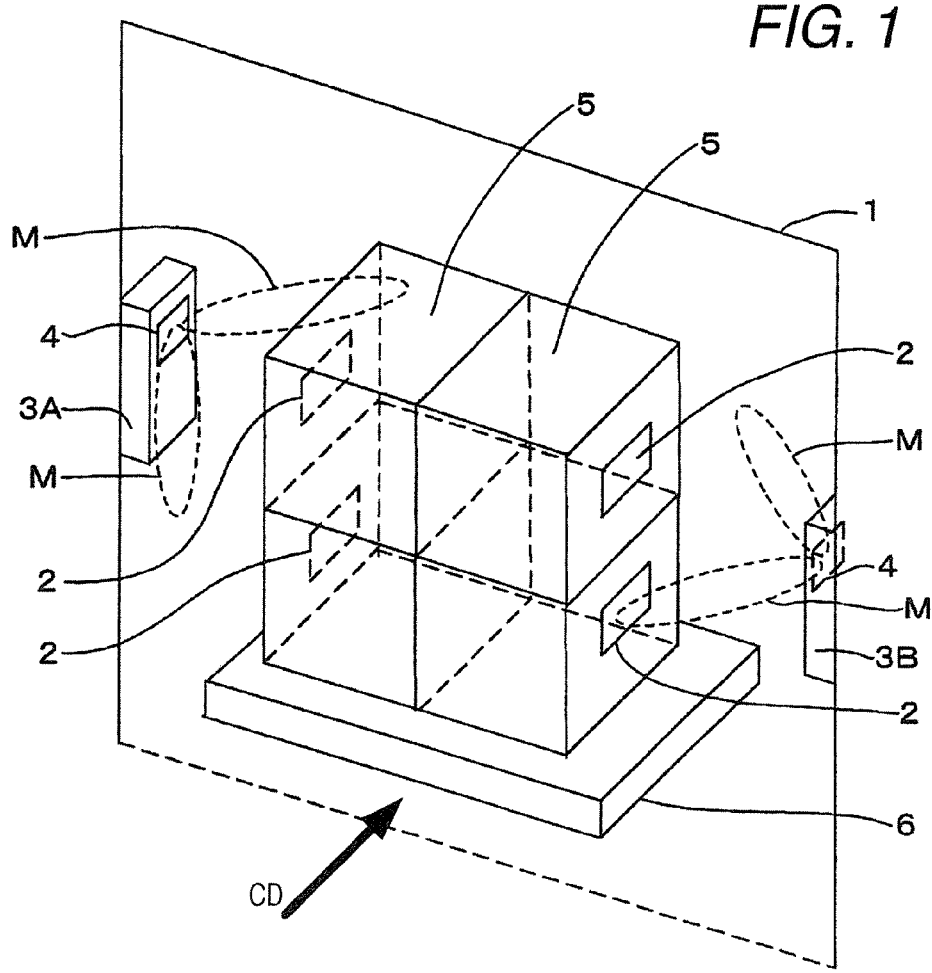
FIG. 1 is a schematic view illustrating an example in which reader/writers (tag communication apparatuses) according to the invention are installed to a dock door which is a carry-in entrance of an article.

As shown in FIG. 1, reader/writers 3A and 3B are disposed at both right and left sides of a dock door 1 so as to oppose each other. In addition, the reader/writers 3A and 3B each include a scan antenna 4 which can scan a beam M of a transmission radio wave. FIG. 1 shows a case where a plurality of articles 5 lifted on a pallet 6 by a forklift (not shown) is being carried through the dock door 1 (the carry-in direction is represented by an arrow CD). An RFID tag 2 is attached to each of the articles 5. In addition, the reader/writers 3A and 3B are each configured so as to perform a wireless communication with the RFID tag 2 while scanning the beam M of the radio wave transmitted from the scan antenna 4.

If scan timing between the scan antennas 4 of the reader/writers 3A and 3B opposed to each other is not synchronized, tag confusion or the like is generated. Accordingly, the reader/writers 3A and 3B are configured so that the scan timing between the opposing reader/writers 3A and 3B is synchronized in order to prevent the tag confusion or the like from being generated.

In FIG. 1, the reader/writers 3A and 3B opposing each other at the right and left sides of the dock door 1 are all configured to have the following synchronization function. However, at least one of the opposing reader/writers 3A and 3B may be configured as in this embodiment. Moreover, each of the reader/writers 3A and 3B and the scan antenna 4 are integrated, but may be wired with a gap therebetween.

In the following description, when the reader/writers 3A and 3B are not distinguished from each other, the reader/writers 3A and 3B are referred to as reader/writers 3. In addition, the reader/writer which adjusts the scan timing is referred to as a home station and the reader/writer which is adjusted is referred to as an away station. Each of the reader/writers in this embodiment has a function of determining by itself whether it serves as the home station or the away station. However, in the following description of each element, the reader/writer 3A serves as the home station and the reader/writer 3B serves as the away station.

First, the configurations of the RFID tag 2 and the reader/writers 3 will be described in detail.

Figure 2:
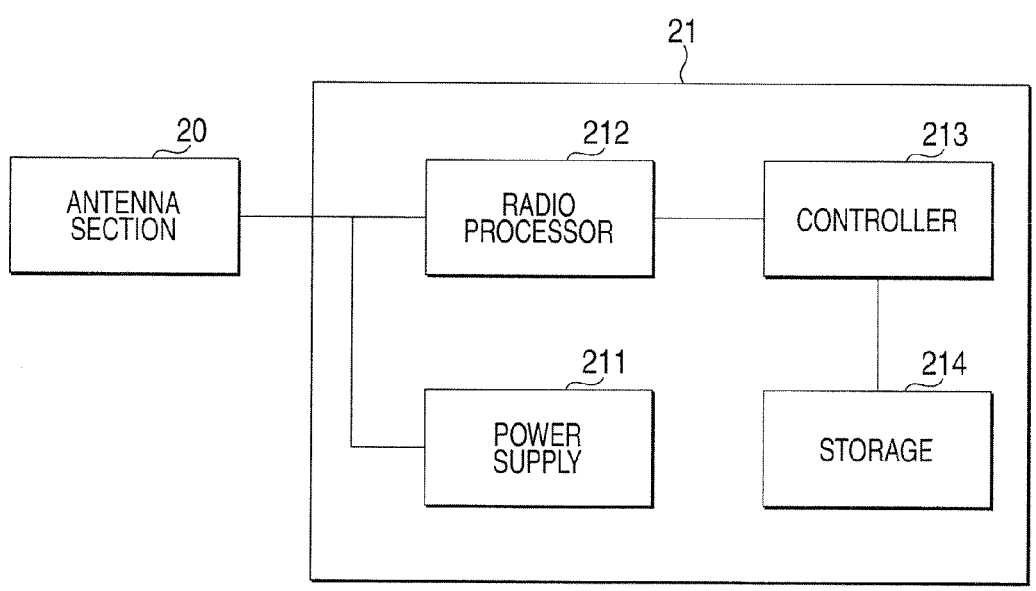
FIG. 2 is a block diagram illustrating an overall configuration of an RFID tag.

As shown in FIG. 2, the RFID tag 2 includes an antenna section 20 and a wireless communication IC 21. As this RFID tag 2, for example, the above-described passive type RFID tag or an active type RFID tag can be used.

As a power source for operating the wireless communication IC 21, the antenna section 20 receives a radio wave from the reader/writers 3. In addition, the antenna section 20 converts the radio wave received from each of the reader/writers 3 into a radio signal, and transmits the converted radio wave to the wireless communication IC 21. In addition, the antenna section 20 also converts the radio signal from the wireless communication IC 21 into the radio wave to transmit the converted radio signal to each of the reader/writers 3. An antenna, a resonant circuit, and the like are used in the antenna section 20.

The wireless communication IC 21 stores data from each of the reader/writers 3 on the basis of the signal received from each of the reader/writers 3 through the antenna 20, or transmits the stored data to each of the reader/writers 3 through the antenna section 20. As shown in FIG. 2, the wireless communication IC 21 includes a power supply 211, a radio processor 212, a controller 213, and a storage 214.

The power supply 211 rectifies an induction voltage generated when the antenna section 20 receives the radio wave by use of a rectification circuit, adjusts the rectified voltage to a prescribed voltage, and supplies the adjusted voltage to each unit of the wireless communication IC 21. A bridge diode, a voltage adjusting condenser, or the like are used in the power supply 211.

The radio processor 212 converts the radio signal received from the outside through the antenna section 20 into an original format and transmits the converted data to the controller 213. In addition, the radio processor 212 converts the received data from the controller 213 into a format suitable for radio transmission and transmits the converted radio signal to the outside through the antenna section 20. An AND (Analog to Digital) converter, a D/A (Digital to Analog) converter, a modulator/demodulator, an RF circuit, and the like are used in the radio processor 212.

The controller 213 controls operations of the above-described various types of configurations in the wireless communication IC 21 as the whole. The controller 213 includes a logic operation circuit, a register, and the like and serves as a computer. In addition, the operations of the various types of the configurations are controlled by executing control program on a computer. This control program may have, for example, a configuration in which a program installed in a ROM (Read-Only Memory) or the like of the storage 214 is read or a configuration in which the program is downloaded from each of the reader/writers 3 through the antenna section 20 and the radio processor 212 to be installed in the storage 214.

On the basis of data received from each of the reader/writers 3 through the antenna section 20 and the radio processor 212, the controller 213 stores the received data in the storage 214. In addition, the controller 213 reads the data stored in the storage 214 and transmits the read data to each of the reader/writers 3 through the radio processor 212 and the antenna section 20.

The storage 214 is configured to include a semiconductor memory such as the ROM, a SRAM (Static RAM), or a FeRAM (a ferroelectric memory). As contents stored in the storage 214, the above-described control program, other various types of programs, and various types of data such as ID may be exemplified. Since the wireless communication IC 21 uses the radio wave transmitted from each of the reader/writers 3 as a power source, it is desirable that a nonvolatile memory such as the ROM or a memory such as the SRAM or the FeRAM consuming less electric power is used.

Next, the configuration of the reader/writers 3 will be described with reference to FIGS. 3 to 5.

Figure 3:
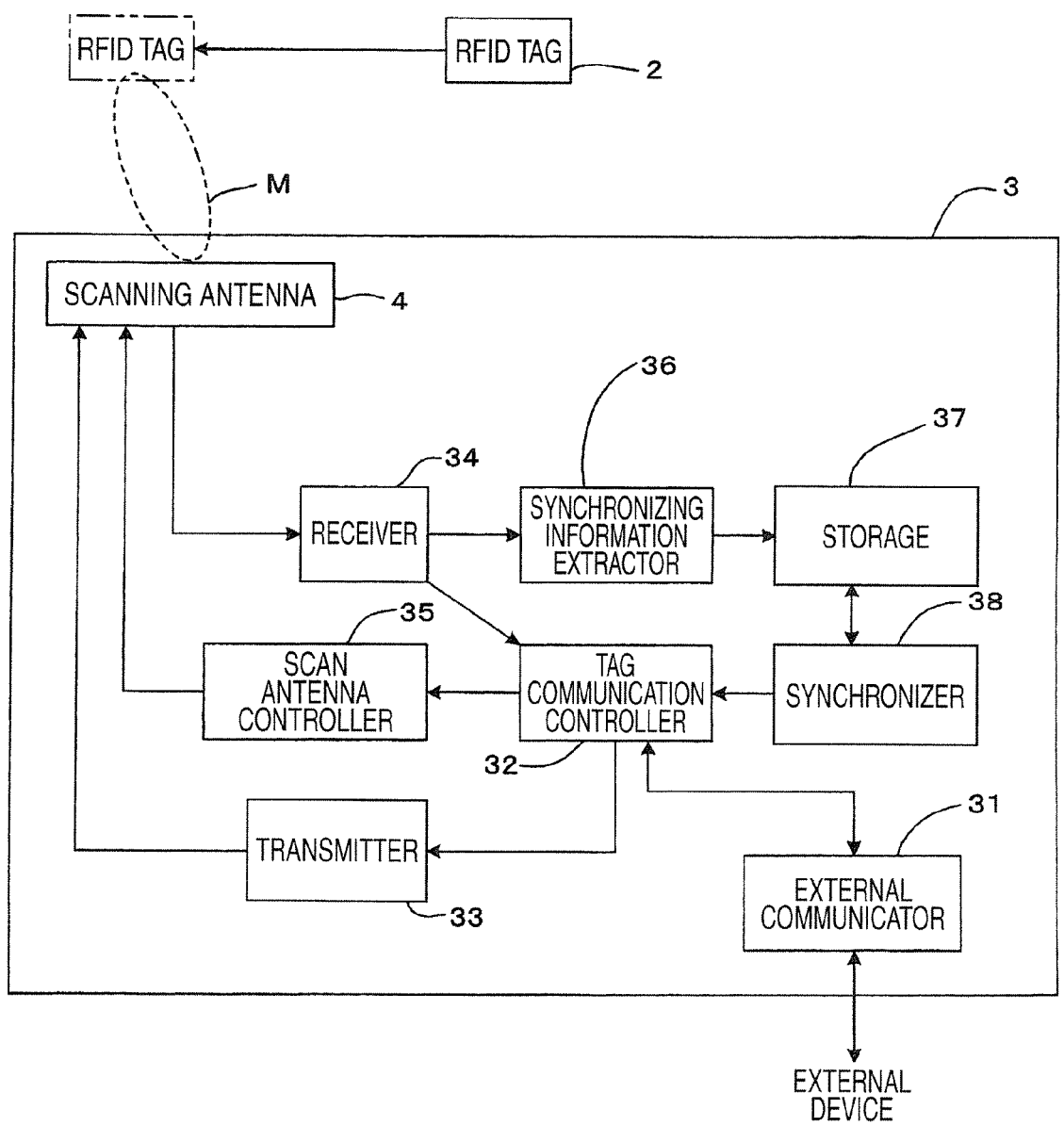
FIG. 3 is a block diagram illustrating an overall configuration of one of the reader/writers.

FIG. 3 illustrates a state that the wireless communication with the RFID tag 2 through the scan antenna 4 is performed.

Each of the reader/writer 3 includes an external communicator 31, a tag communication controller 32, a transmitter 33, a receiver 34, a scan antenna controller 35, a synchronizing information extractor 36, a storage 37, a synchronizer 38, and a scan antenna 4. In addition, each of the reader/writers 3 is configured to perform the wireless communication with the RFID tag 2.

The external communicator 31 transmits the communication result obtained by performing the communication with the RFID tag 2 to an external device such as a PC. As the communication result, information indicating whether the ID (identification) of the RFID tag 2 read from each of the reader/writers 3 and information indicating whether the RFID tag 2 is successfully recorded are exemplified. In addition, the external communicator 31 receives record information about the RFID tag 2 from an external device or a command from the external device. When the reader/writers 3A and 3B are synchronized with each other, the external communicator 31 transmits information indicating the synchronization to the external device. As an interface standard for performing communication with the external device, a USB (Universal Serial Bus), IEE1394, Ethernet (registered trademark), and the like are exemplified.

The tag communication controller 32 receives transmission command information transmitted from the external device through the external communicator 31, and transmits the transmission command information to the transmitter 33. An antenna beam pattern of the scan antenna 4, that is, a scan angle is stored in the tag communication controller 32. Specifically, as shown in FIG. 5, the scan angle refers to a gradient angle of the beam M measured on the basis of a broadside direction BS (which is a direction perpendicular to a direction of the antenna elements 40A, 40B, . . . , 40K are arrayed). In this embodiment, a right direction ($\alpha$) of the drawing is referred to as a positive value and a left direction ($\beta$) of the drawing is referred to as a negative value. In addition, the tag communication controller 32 includes data which define an electric power and a phase of the respective antenna elements 40A to 40G of the scan antenna 4. An antenna beam pattern of the scan antenna 4 is generated by electrically setting the defined electric power and the phase of the respective antenna elements 40A to 40C.

The transmitter 33 converts the transmission command information transmitted from the tag communication controller 32 into a format suitable for the wireless communication, and transmits the converted radio signal (transmission command information) to the outside through the scan antenna 4. In addition, the transmitter 33 performs modulation, amplification, or the like of the transmission command information. Moreover, in a case where each of the reader/writers 3 is realized as the third embodiment and one of the reader/writers 3 serves as the away station 3B, the transmitter 33 appends synchronizing data to the transmission command information transmitted to the RFID tag 2 to transmit the appended synchronizing data. The details will be explained in the descriptions of the third embodiment.

The receiver 34 converts the radio signal (reception data) received from the outside through the scan antenna 4 into the original format, and transmits the converted data to the tag communication controller 32. In addition, the receiver 34 receives the radio wave transmitted from the reader/writer 3B which serves as the away station (hereinafter, referred to as the away station 3B). The receiver 34 also transmits the reception data to the synchronizing information extractor 36 and performs amplification, modulation, and the like of the reception data.

The scan antenna controller 35 receives scan angle information from the tag communication controller 32 and transmits a scan control signal to the scan antenna 4 on the basis of the received scan angle information. In addition, the scan antenna controller 35 controls the direction of the beam M of the radio wave radiated from the scan antenna 4. For example, when the scan angles $\alpha$ and $\beta$ are set, the scan antenna controller 35 converts the scan angle information into the scan control signal for sequentially allowing the beam M of the radio wave radiated from the scan antenna 4 to be directed to the directions of the scan angles $\alpha$ and $\beta$, and then transmits the converted scan control signals to the scan antenna 4.

The synchronizing information extractor 36 extracts synchronizing information from the reception data which the receiver 34 receives from the away station 3B. Specifically, reception levels of the radio wave received from the away station 3B correspond to the synchronizing information in the first embodiment, a temporal variation in the reception levels of the radio wave received from the away station 3B corresponds to the synchronizing information in the second embodiment, and the data transmitted from the away station 3B corresponds to the synchronizing information in the third embodiment. The details will be explained in the descriptions of each embodiment. In addition, the synchronizing information extractor 36 transmits the extracted synchronizing information to the storage 37.

The synchronizing information extracted by the synchronizing information extractor 36 is stored in the storage 37. Specifically, the reception levels received from the away station 3B are stored in the first embodiment described below, the temporal variation of the reception levels is stored in the second embodiment, and the reception command transmitted from the away station 3B is stored in the third embodiment.

The synchronizer 38 makes synchronization of the scanning timing between the home station 3A and the away station 3B using the synchronizing information transmitted from the synchronizing information extractor 36 and stored in the storage 37 and using the information stored in the storage 37 in advance. The details will be explained in the descriptions of each embodiment.

Figure 4:
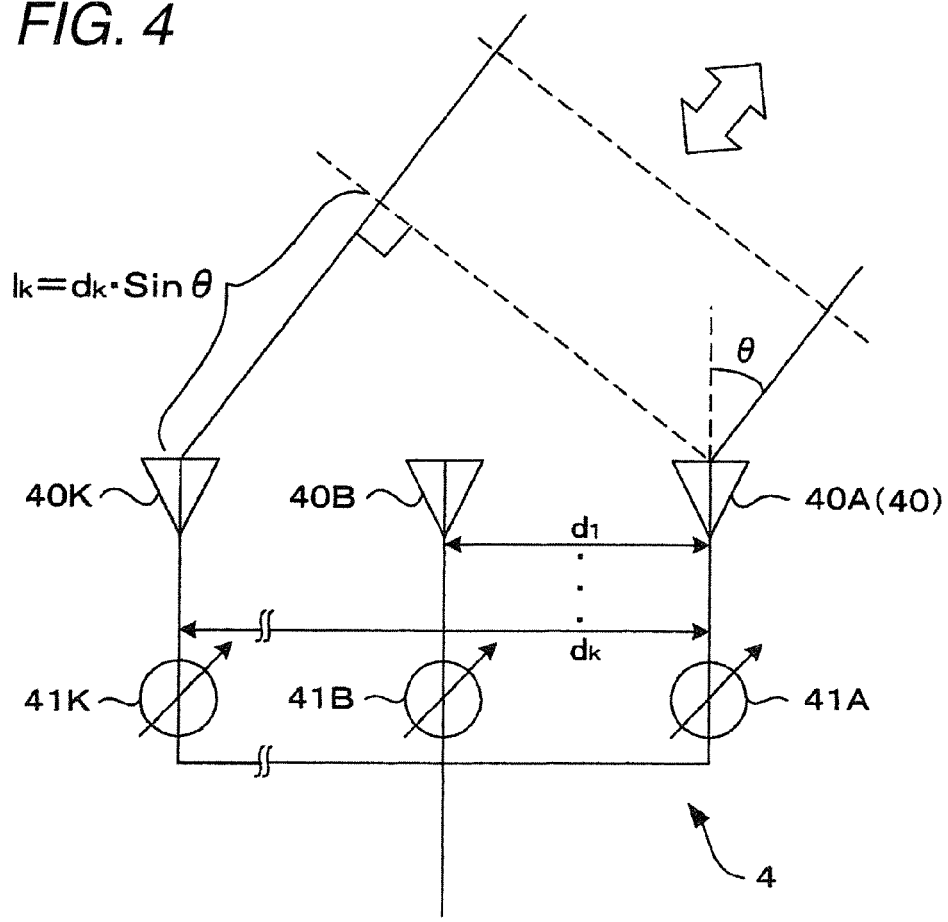
FIG. 4 is a schematic view illustrating an overview of a scan antenna.
Figure 5:
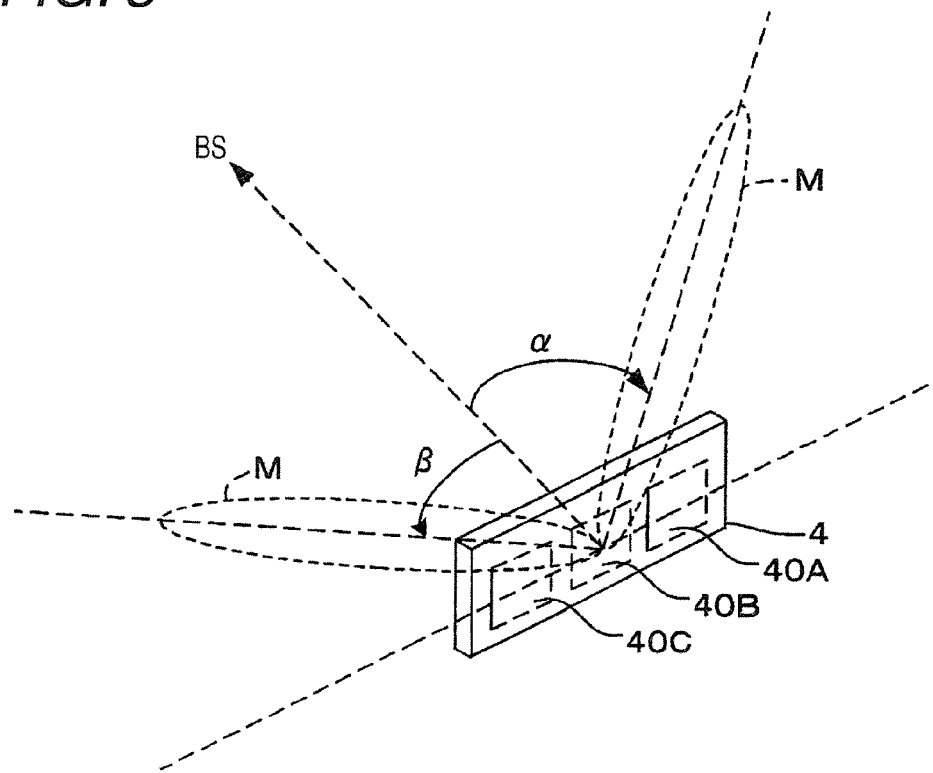
FIG. 5 is a schematic view illustrating the scan antenna which performs a scanning operation.

As shown in FIG. 4, the scan antenna 4 has a configuration in which a plurality of antenna elements 40 are arrayed and each of the antenna elements 40 is connected to a variable phase shifter 41. In FIG. 4, the number of the antenna elements 40 is three, but the number of the antenna elements 40 may be arbitrary. As the number of the antenna elements 40 increases, the width of the beam M becomes thin. A method of scanning the beam direction in the scan antenna 4 will be described with reference to FIG. 4.

When all the antenna elements 40A, 40B, . . . , 40K transmit the radio wave having the same phase, the radio wave radiated from the scan antenna 4 is transmitted as a plane wave in the broadside direction BS (which is the direction perpendicular to the arrayed direction of the antenna elements 40A, 40B, . . . , 40K). On the other hand, in order to incline the transmitting direction of the radio wave by an angle θ (rad) from the broadside direction BS, the phase of the radio wave transmitted by the antenna elements 40A, 40B, 40K may be shifted so as to meet the following equation.

As shown in FIG. 4, assuming that a wavelength of the radio wave to be transmitted or received is λ (m), a distance between the antenna element 40A as a reference and an k-th antenna element 40K is dk (m), and a distance between an equi-phase wave surface passing the antenna element 40A as a reference among equi-phase wave surfaces shown by dashed lines in FIG. 4 and the k-th antenna element 40K is lk (m), the shift φk of the phase of the k-th antenna element 40K with respect to the phase of the antenna element 40A as a reference is expressed by the following equation.

$$\phi k = 2\pi \cdot lk/\lambda = 2\pi \cdot dk \cdot \sin \theta / \lambda$$

In this way, the scan antenna 4 allows the beam M of the radio wave to be directed to a desired direction by shifting the phase of the signal so that phase shifters 41A, 41B, . . . , 41K meet the above equation.

First Embodiment

In the first embodiment, the reader/writer 3B as the home station makes synchronization using the reception level of the radio wave received from the reader/writer 3A as the away station. Hereinafter, the first embodiment will be described with reference to FIGS. 6 to 11B.

Figure 7:
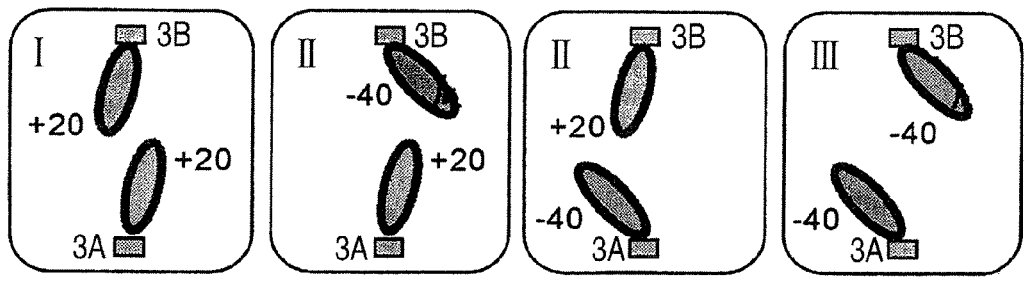
FIG. 7 is a diagram for explaining a scan example.

First, a case where the reader/writers 3A and 3B are all set to −40° and +20° will be described. In addition, combinations of the beam of the transmission radio wave between the reader/writers 3A and the reader/writer 3B are four cases as shown in FIG. 7. Accordingly, the reception levels of the patterns are stored in the storage 37 in advance. In this case, since the reception levels of second and third combinations become identical to each other, three levels are possible as the reception level. It is stored in the storage 37 in advance that it is considered that the synchronization is made when the actually measured reception levels are the reception levels of cases I and III.

Figure 6:
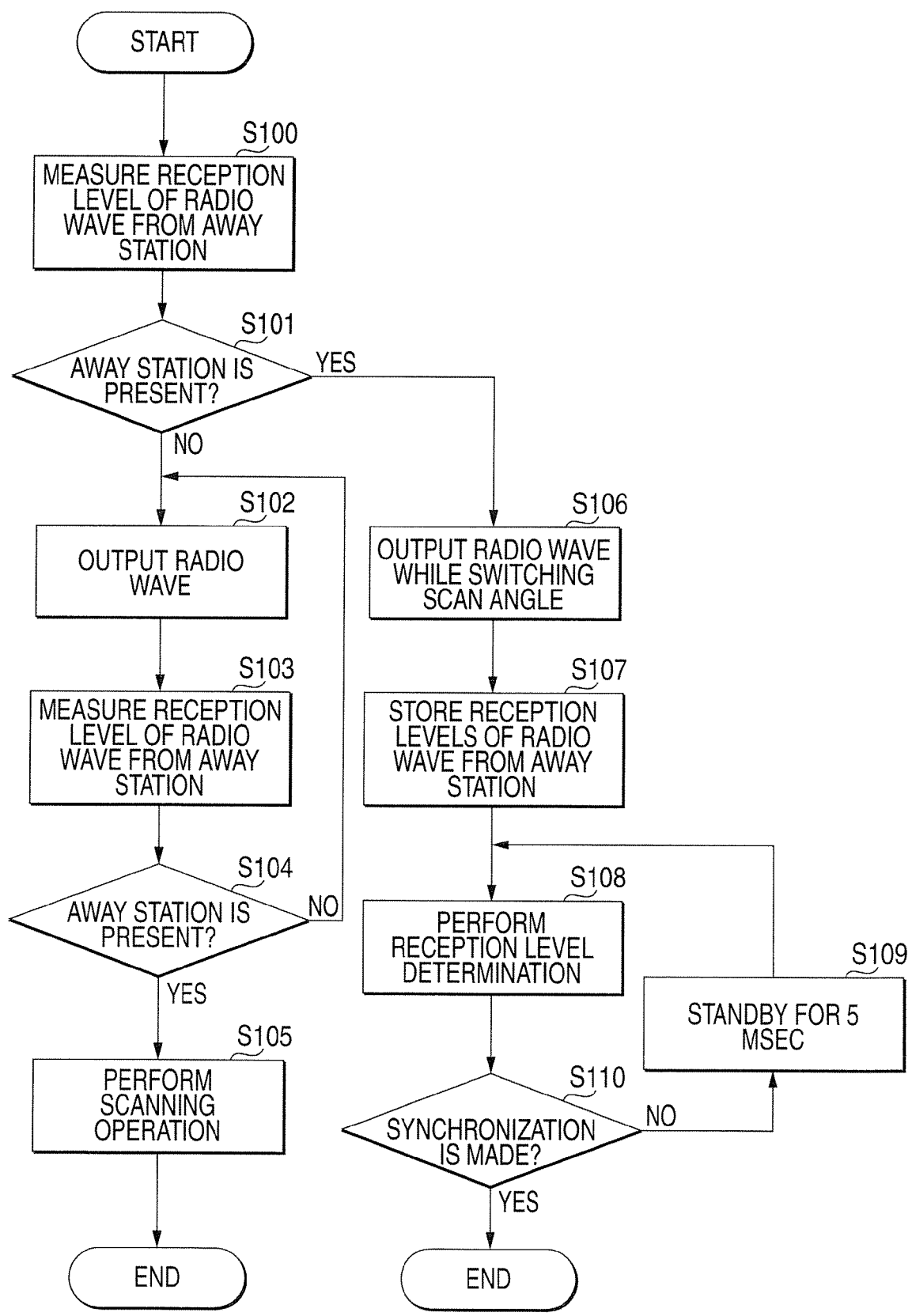
FIG. 6 is a flowchart illustrating a synchronizing operation according to a first embodiment of the invention.

As shown in FIG. 6, this synchronizing operation between the reader/writers 3A and 3B starts when the power is input to reader/writer 3A or 3B. When performing the synchronizing operation, each of the reader/writers 3A and 3B is configured to determine by itself whether it serves as the home station or the away station of the opposing reader/writers.

Specifically, when this synchronizing operation starts, the reception level is first measured (S100). Next, it is detected whether the away station is present (S101). For example, when the reader/writer 3A performs this synchronizing operation and the radio wave is not transmitted from the reader/writer 3B, the reception level becomes "0", and then it is determined that the away station of the reader/writer 3A is not present (N in S101). At this time, the reader/writer 3A outputs the radio wave (S102), the reception level is measured again (S103), and then it is detected whether the away station is present (S104). If it is detected that the away station is present (Y in S104), a scanning operation starts (S105). Alternatively, if it is detected that the away station is not present (N in S104), the radio wave is output (S102) and the reception level is measured (S103) until the away station is detected. In this case, the reader/writer 3A becomes the away station of the reader/writer 3B. In addition, reader/writer 3B serves as the home station. That is, the reader/writer 3B serves as adjusting to scanning timing of the reader/writer 3A.

Figure 8:
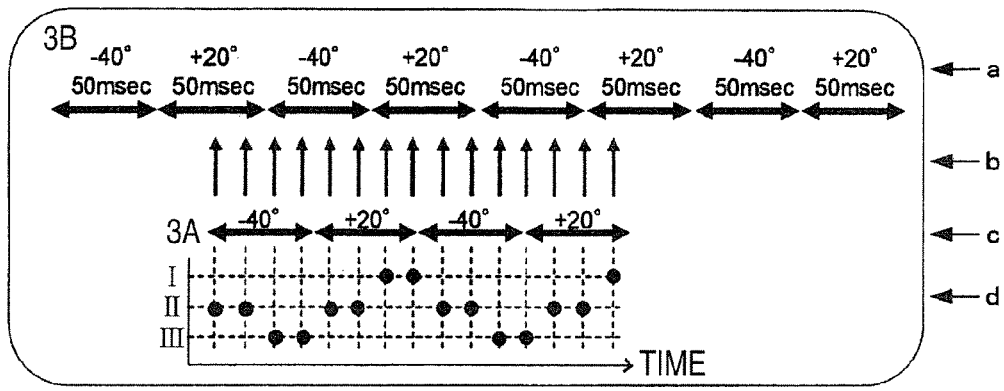
FIG. 8 is a diagram illustrating the reception level in a case where a home station and an away station are not synchronized with each other.

In S101, on the other hand, if it is detected that the away station is present (Y in S101), each of the reader/writers 3A outputs the radio wave while switching the scan angles (S106) and stores the reception levels of the scan angles to the storage 37 (S107). Subsequently, the reception levels stored in the storage 37 are compared to the reception level pattern which has been stored in the storage 37 in advance, and the reception level determination is performed (S108). This determination will be described with reference to FIGS. 8 to 10. FIG. 8 shows a case where the reader/writer 3A serves as the home station and the reader/writer 3B serves as the away station, and the reader/writer 3A adjusts the scan timing thereof to make the synchronization with the reader/writer 3B.

First, the reader/writer 3B serving as the away station switches a beam pattern of the scan antenna 4 to scan angles −40° and +20° every 50 msec (an arrow a). Subsequently, the reader/writer 3A serving as the home station switches the beam pattern of the scan antenna 4 to the scan angles −40° and +20° every 50 msec (an arrow c), and measures the reception levels of the scan angles (an arrow b). The reception levels measured in this manner are indicated by an arrow d. In addition, the reception levels of all the cases I, II and III shown in FIG. 7 are all measured, and thus it is considered the reader/writers 3A and 3B are not synchronized with each other.

Figure 9:
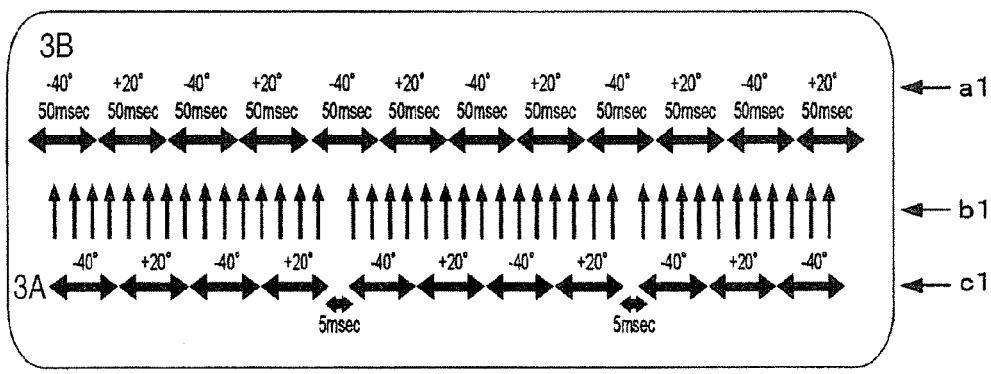
FIG. 9 is a diagram for explaining a method of making synchronization.

When the reception level determination (S108) is performed in the above-described manner and thus the synchronization is not made (N in S110), the reader/writer 3A serving as the home station starts the next switch of the scan angle of the scan antenna 4 after a standby time of 5 msec (S109). In addition, the reader/writer 3A again performs the reception level determination (S108) to determine whether the synchronization is made. Specifically, as shown in FIG. 9, the scan timing of the reader/writer 3B as the away station is indicated by an arrow a1 and is not changed. In addition, when the scan angles of the reader/writer 3A serving as the home station are switched, the scanning operation is performed (an arrow c1) after the standby time of 5 msec and the reception levels are measured at this time (an arrow b1). Based on the measurement result, the reception level determination (S108) is performed. If the synchronization is not made, the scanning operation is again performed after the standby time of 5 msec (an arrow c1).

Figure 10:
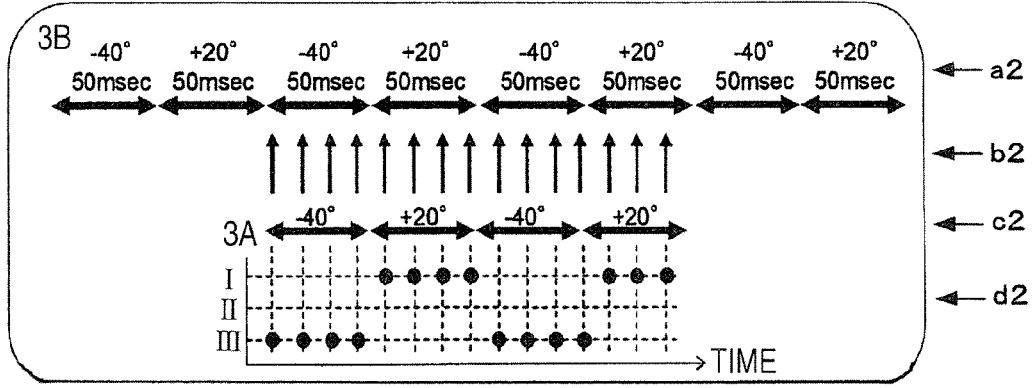
FIG. 10 is a diagram illustrating the reception level in a case where the home station and the away station are synchronized.

Such operations are performed until the synchronization is made. When the synchronization is made (Y in S110), the synchronizing operation ends. A case where the synchronization is made by performing the above-described operations is shown in FIG. 10. That is, the reader/writer 3B as the away station repeats the scanning operation at the scan angles of −40° and +20° (an arrow a2). On the other hand, the reader/writer 3A as the home station repeats the scanning operation at the scan angles of −40° and +20° (an arrow c2), and the reception levels are measured at this time (an arrow b2). As a result, the measured reception levels are indicated by an arrow d2. That is, the measured reception levels represent only the reception levels of the cases I and III shown in FIG. 7. In this case, when the reader/writer 3B scans the scan angle of −40°, the reader/writer 3A also scans the scan angle of −40°. In addition, when the reader/writer 3B scans the scan angle of +20°, the reader/writer 3A also scans the scan angle of +20°.

When the synchronizing operation ends, data indicating the end of the synchronizing operation is transmitted to an external device (not shown). Subsequently, when a wireless communication with the RFID tag 2 is performed, it is possible to perform the wireless communication with the RFID tag 2 in a good condition without generation of tag confusion. Moreover, such a synchronizing operation may be performed at a periodic interval such as every 1 hour or 3 hours.

Figure 11A:
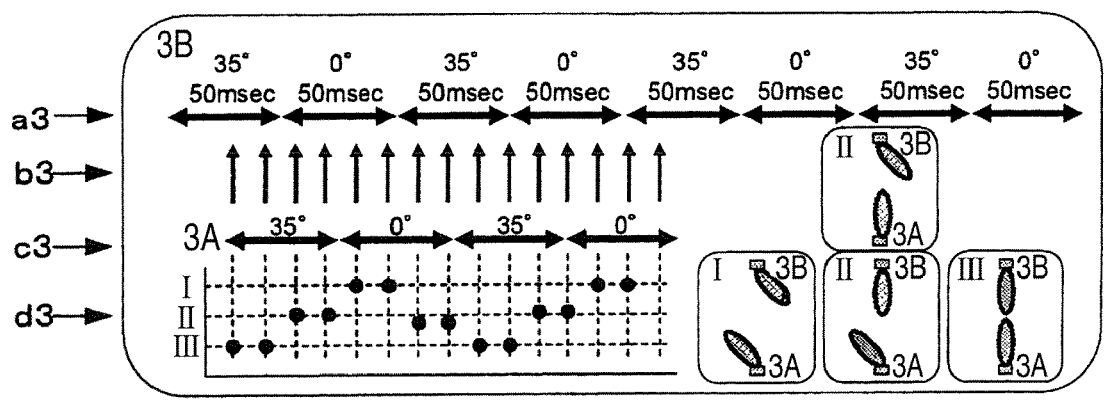
FIG. 11A is a diagram illustrating a modified example of the first embodiment, for explaining a state that the synchronization is not made.
Figure 11B:
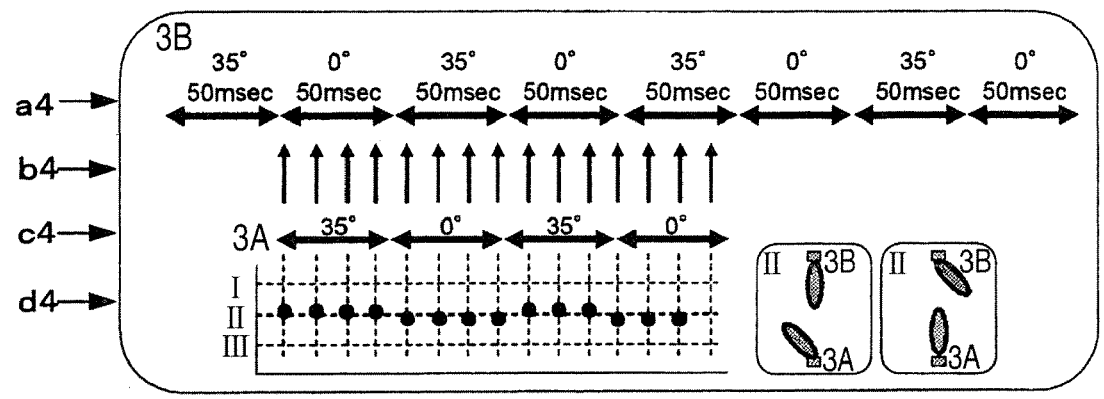
FIG. 11B is a diagram for explaining a state that the synchronization is made in the modified example.

FIGS. 11A and 11B show a modified example of the first embodiment, in which the scan angles of the reader/writers 3A and 3B are all set to +35° and 0°. In this case, possible combinations of the beam of the radio wave transmitted between the reader/writers 3A and 3B are four cases shown in FIG. 11A. In addition, the reception levels are stored in the storage 37 in advance in the above-described manner. In this case, it is stored in the record 37 in advance that it is considered that the synchronization is made when the actually measured reception levels are only levels of the case II shown in FIG. 11A.

FIG. 11A shows a state that the synchronization is not made. FIG. 11B shows a state that the synchronization is made and only the levels of the case II have been measured as the reception levels. When the scan angle of 0° is included and the scan angles are switched to 0°, an output level of the beam of the radio wave may be lowered.

The scan angles are not limited to the above-described scan angles, but various combinations of the scan angles of binary values may be possible. In addition, it is not required that the scan angles of the reader/writers 3A and 3B are equal to each other. For example, the scan angles of the reader/writer 3A are −40° and +20°, but the scan angles of the reader/writer 3B may be −20° and +40°.

The switch time and the standby time of the beam pattern are not limited to the foregoing description, but may be appropriately set by users.

Second Embodiment

A second embodiment of the invention will be described with reference to FIGS. 12 and 13. In this embodiment, the synchronization is made by using a temporal variation in the reception level of the radio wave of which the reader/writer 3A as the home station receives from the reader/writer 3B as the away station. Similarly with the first embodiment, each of the reader/writers 3A and 3B can determine by itself whether it is the home station or the away station. In the following description, the points as same as the first embodiment will be omitted, and different points will be made in detail.

Figure 12:
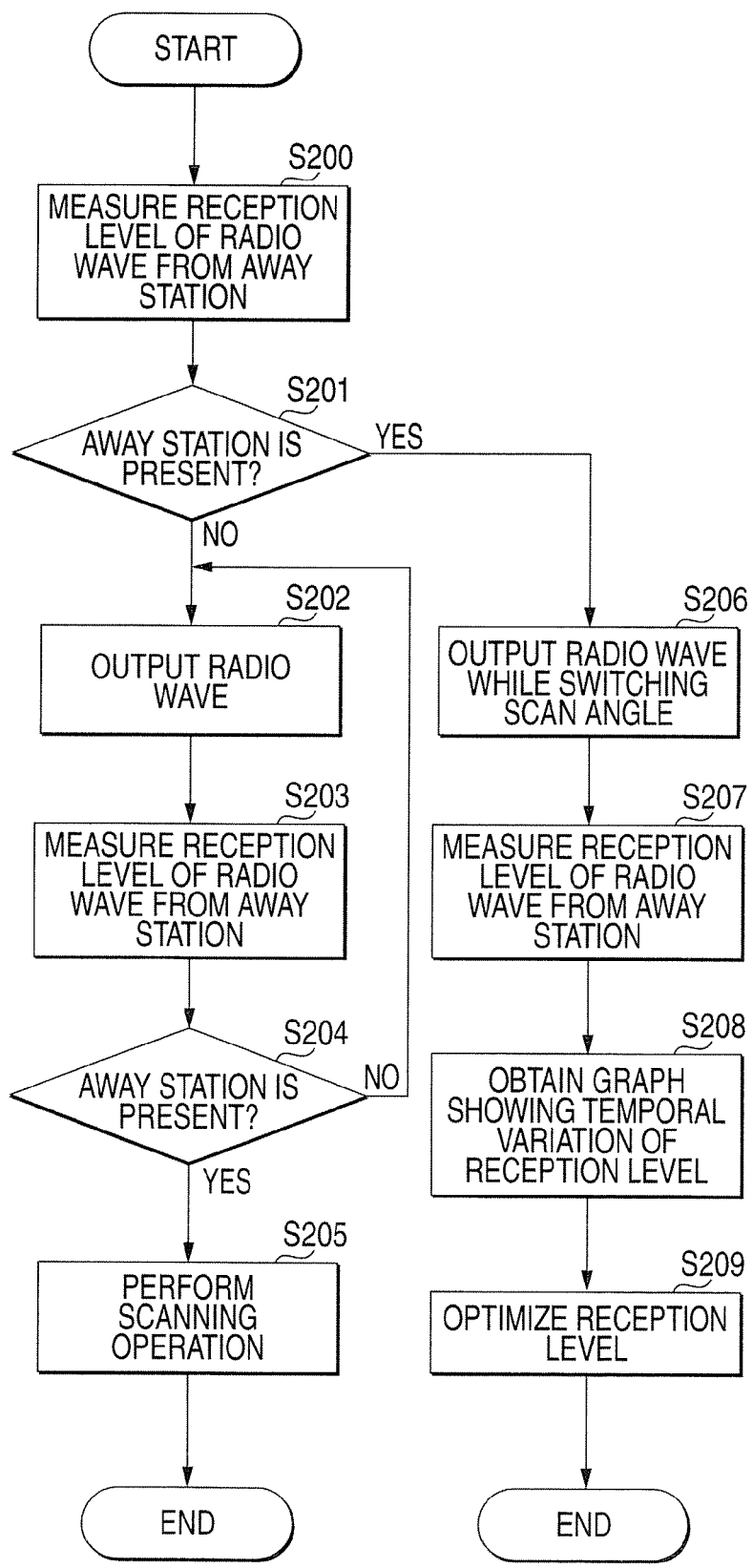
FIG. 12 is a flowchart illustrating a synchronizing operation according to a second embodiment of the invention.
Figure 13:
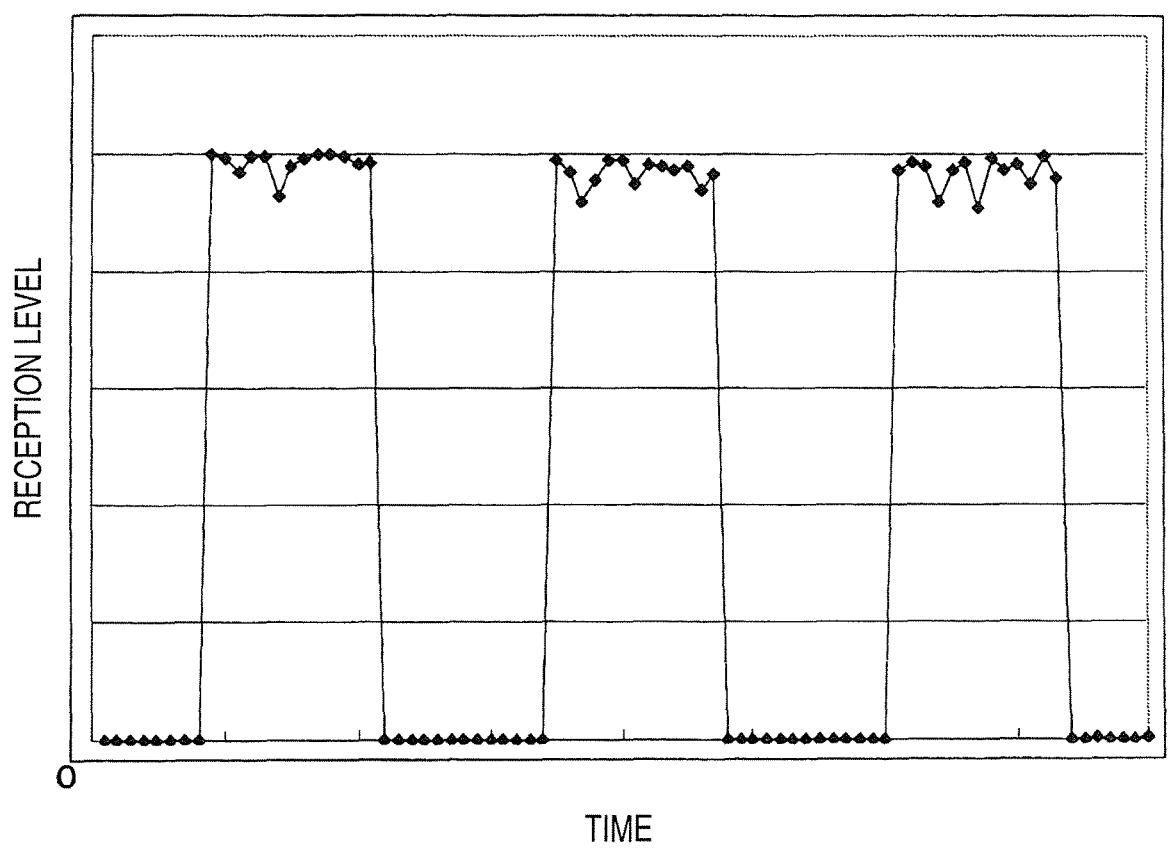
FIG. 13 is a graph obtained by the synchronizing operation of FIG. 12.

In the second embodiment, as shown in FIG. 12, for example, when the reader/writer 3A is activated, the reception levels are measured (S200) and it is detected whether the away station is present (S201). Operations (S202 to S205) in which it is detected that the away station is not present are the same as the operations of S102 to S105 shown in FIG. 6 according to the first embodiment.

Alternatively, when it is detected that the away station is present (Y in S201), the radio wave is output (S206) to measure the reception levels (S207). However, unlike the case according to the first embodiment, the radio wave is transmitted in a state that one of the binary scan angles is fixed as the beam pattern of the reader/writer 3A as the home station. At this time, the reception levels are measured to obtain a graph showing the temporal variation in the reception levels, as shown in FIG. 13 (S208).

For example, in a case where the scan angles of the reader/writers 3A and 3B are set to +20° and −40° in advance, the reader/writer 3B as the away station repeats a scanning operation at the scan angles of +20° and −40=, but the reader/writer 3A as the home station measures the reception levels in a state that the scan angle is fixed to +20°. A graph in FIG. 13 shows the temporal variation in the reception levels actually measured in this way by the reader/writer 3A. A horizontal axis represents an intensity of the reception levels and a horizontal axis represents time.

The reader/writer 3B as the away station switches the beam pattern every interval of 50 msec. On the other hand, the reader/writer 3A as the home station measures the reception levels every an interval of 3.8 msec. In FIG. 13, the intensity of the reception levels varies every 13 points (i.e., 13 points× 3.8 msec≈50 msec). In this case, since the beam pattern of the reader/writer 3A as the home station is fixed, that is, the scan angle is fixed to +20°, it is known that variation in the intensity of the reception levels in FIG. 13 is induced from the switch of the scan angles of the reader/writer 3B as the away station. In the second embodiment, the reader/writer 3A as the home station can grasp the switch timing of the beam pattern of the away station. In addition, using the switching timing of the reader/writer 3B as the away station acquired by the reader/writer 3A, the reader/writer 3A performs a reception level optimizing operation (S209) of making synchronization of the switch timing of the beam pattern of the reader/writer 3A.

Like the first embodiment, in the second embodiment, the scan angles, a measurement time interval of the reception levels, a switch interval of the beam pattern, and the like can be set arbitrarily by a user.

Third Embodiment

A third embodiment of the invention will be described with reference to FIGS. 14 and 15. In this embodiment, the reader/ writer 3A as the home station is configured to acquire synchronizing information from data transmitted from the reader/writer 3B as the away station and make synchronization on the base of the synchronizing information.

Like the first embodiment, each of the reader/writers 3A and 3B can also determine by itself whether it is the home station or the away station. In the following description, the points as same as the first embodiment will be omitted and the different points will be described in detail.

Figure 14:
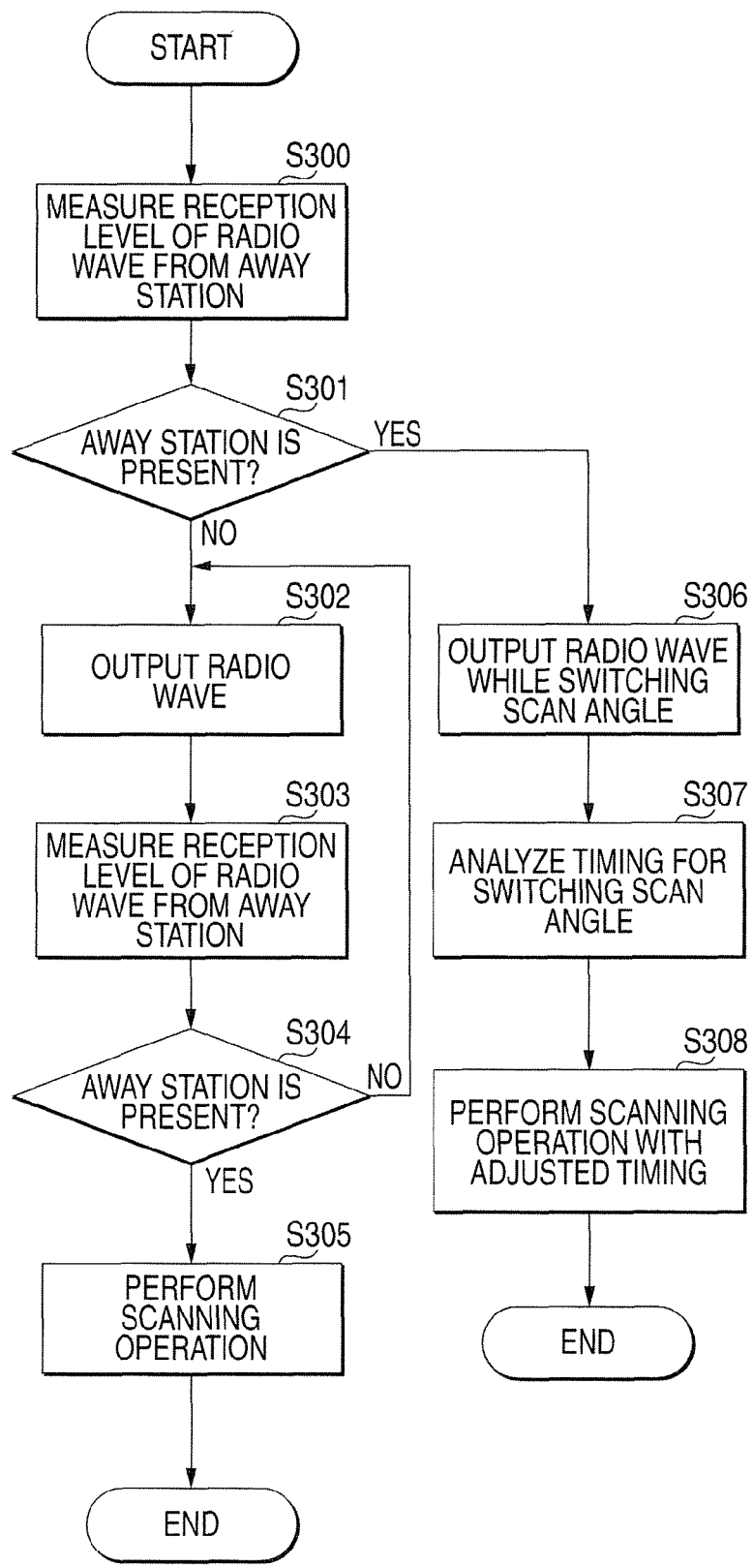
FIG. 14 is a flowchart illustrating a synchronizing operation according to a third embodiment of the invention.
Figure 15A:
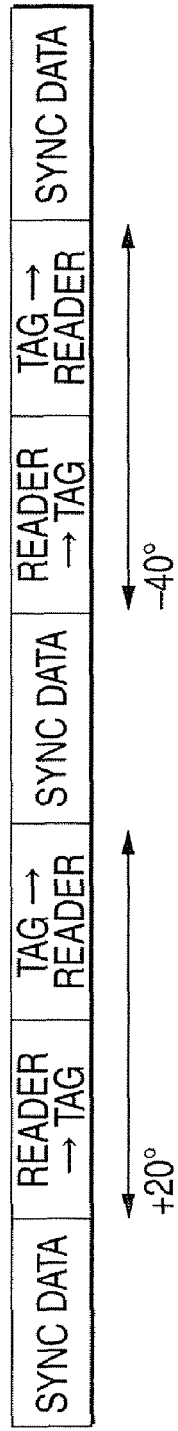
FIG. 15A is a diagram illustrating data transmitted from the reader/writers, showing a case where synchronizing data is appended every communication between the reader/writers and the RFID tag.
Figure 15B:
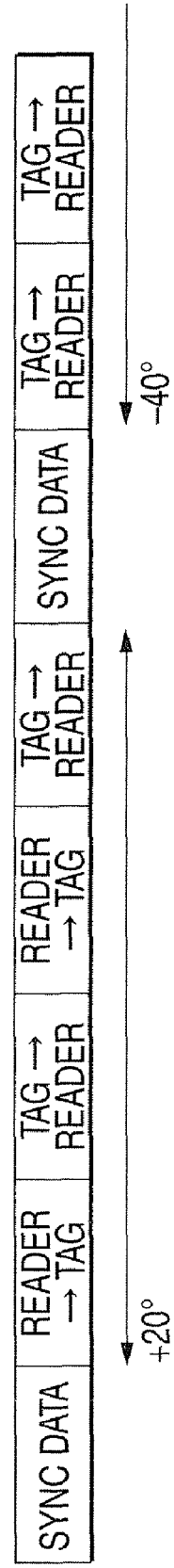
FIG. 15B is a diagram illustrating data transmitted from the reader/writers, showing a case where synchronizing data is appended every plural communications between the reader/writers and the RFID tag.

As shown in FIG. 14, for example, when the reader/writer 3A is activated, the reception levels are measured (S300) to detect whether the opposite is present (S301). Operations (S302 to S305) in the case where the away station is not detected are the same as those of S102 to S105 shown in FIG. 6 according to the first embodiment. However, transmission signals transmitted from the reader/writer 3B as the away station are transmission signals shown in FIG. 15A or 15B. That is, in normal communication between the respective reader/writers 3 and the RFID tag 2, a communication command for reading out the ID or the data stored in the RFID tag 2 is transmitted from the reader/writer 3 to the RFID tag 2. The RFID tag 2 transmits a response to the reader/writers 3 in accordance with the communication command. In this embodiment, as shown in these figures, synchronizing data is appended to the communication command transmitted to the RFID tag 2.

The synchronizing data is information which is meaningless for the RFID tag 2, and is not the command which deteriorates the communication between the respective reader/writers 3 and the RFID tag 2. Such synchronizing data is just data which the opposing reader/writer 3A receives and performs the switch timing of the scan angles. However, for example, if data indicating that the scan angles of the reader/writer 3B as the away station are +20° and −40° is appended, it is possible to recognize not only the switch timing but also which direction the antenna beam pattern of the reader/writer 3B is directed.

Alternatively, in FIG. 14, when it is detected that the away station is present (Y in S301), the reader/writer 3A serves as the home station and receives the communication command transmitted from the reader/writer 3B as the away station (S306). As described above, the communication command is similar to the data shown in FIG. 15A or 15B. When the reader/writer 3A receives the communication command, an analysis operation of the switch timing of the antenna beam pattern is performed using the received communication command (S307). The analysis operation is performed by analyzing the communication command shown in FIG. 15A or 15B. Since the synchronizing data indicating the switching timing of the antenna beam pattern of the reader/writer 3B is appended to the communication command, the beam pattern of the reader/writer 3A is switched at timing at which the synchronizing data is received. At this time, when the reader/writer 3A starts to perform the scanning operation with timings based on the analyzed result (S308), it is possible to perform the communication with the RFID tag 2 in the state that the reader/writers 3A and 3B are synchronized with each other.

Fourth Embodiment

A fourth embodiment of the invention will be described with reference to FIGS. 16 to 22. In this embodiment, an article 5 attached with the RFID tag 2 is configured to be detected after the reader/writers 3A and 3B are synchronized with each other according one of the first to third embodiments.

Figure 16A:
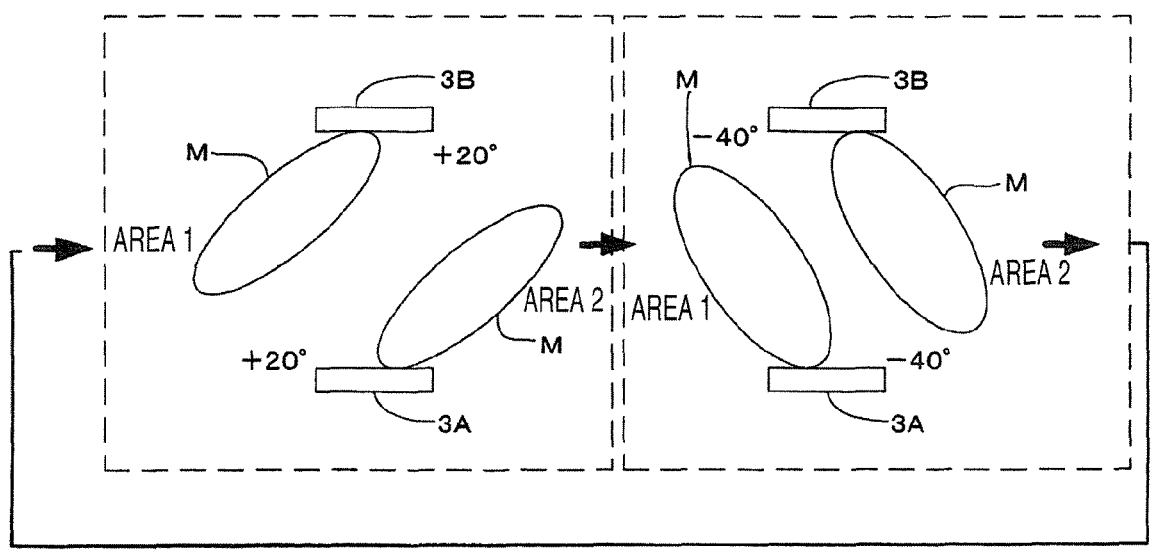
FIGS. 16A and 16B are diagrams for explaining a method of detecting a moving direction of an article, according to a fourth embodiment of the invention.
Figure 16B:
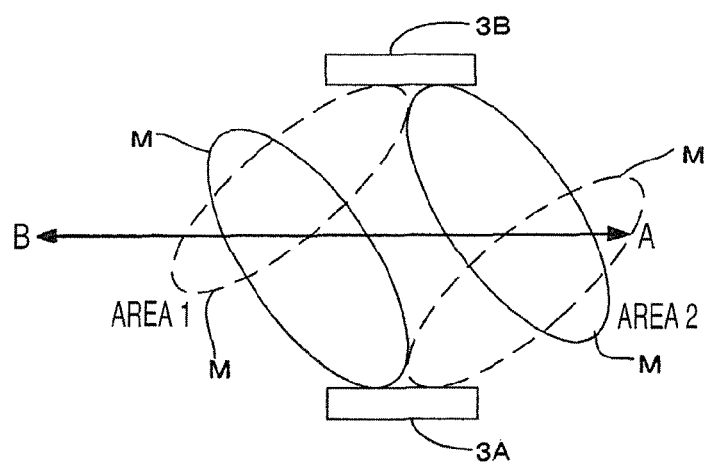

As shown in FIGS. 16A and 16B, the reader/writers 3A and 3B are disposed so as to oppose each other and an article provided with the RFID tag 2 is passed between the reader/writers 3A and 3B. In this case, all the reader/writers 3A and 3B repeat the scanning operation in the beam pattern of the scan angles of +20° and −40°. In addition, the reader/writers 3A and 3B are synchronized with each other in the scanning operation.

Figure 22:
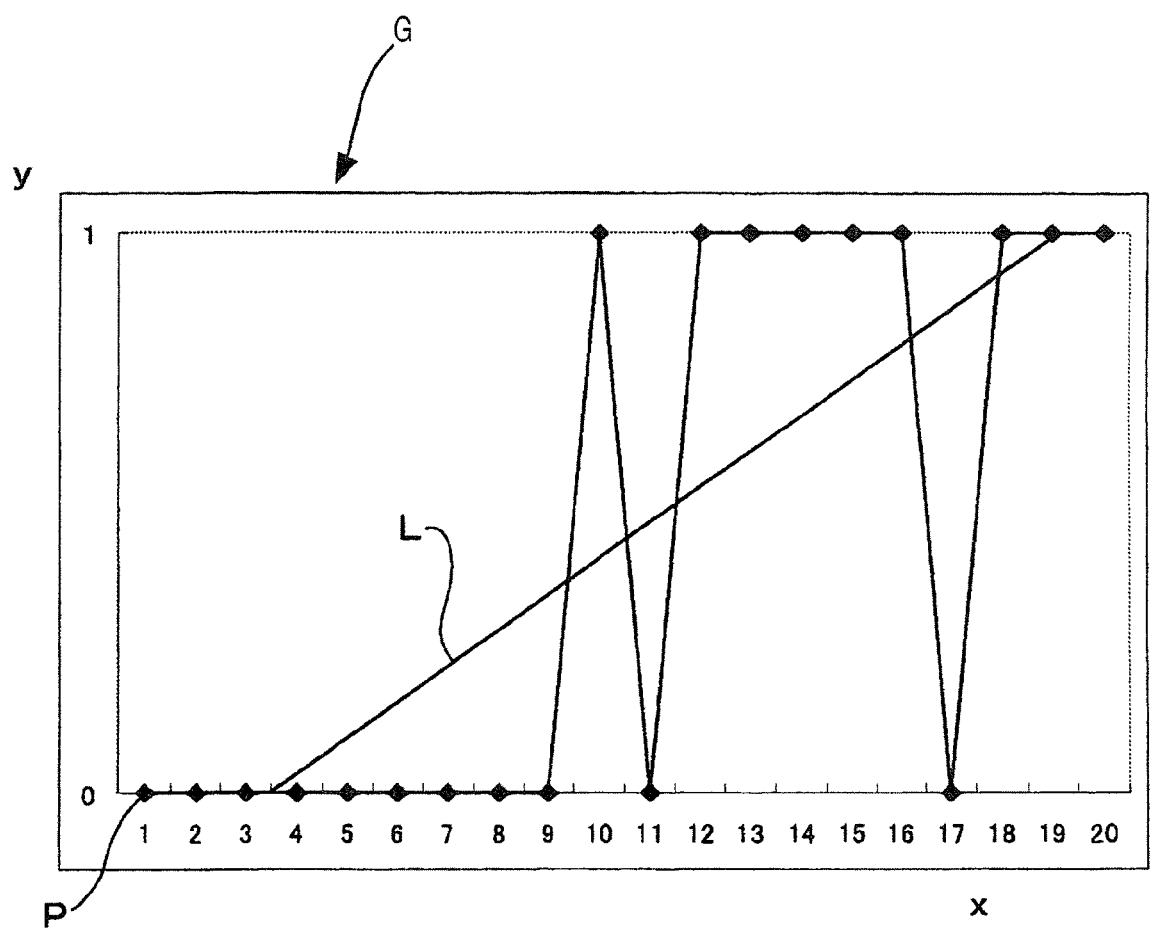
FIG. 22 shows a movement direction estimating graph used in the method of FIG. 16.

An algorithm for detecting movement will be simply described with reference to FIGS. 16A and 16B. For example, when the RFID tag 2 is moved from an area 1 to an area 2, the RFID tag 2 is first read in the area 1. Afterward, the RFID tag 2 is read in the area 2 as the RFID tag 2 is moved. A temporal variation of the reading result (i.e., the movement of the RFID tag 2) is shown in FIG. 22. The more details will be described below.

Next, the configuration of the reader/writers 3 will be described with reference to FIGS. 17 to 19. The reader/writers 3 in this embodiment have different function of detecting the movement state of the RFID tag 2 in addition to the synchronizing function. Hereinafter, points different from the reader/writers 3 shown in FIG. 3 will be described and the same points will be omitted.

An external communicator 31 transmits the communication result obtained by performing the communication with the RFID tag 2 to an external device such as PC. As the communication result, an ID (identification) of the RFID tag 2 read by each of the reader/writers 3, movement direction information of the article 5 attached with the RFID tag 2 calculated by a movement direction estimator 39, information indicating whether the RFID tag 2 is successfully recorded are exemplified. In addition, the external communicator 31 receives record information (transmission command information) about the RFID tag 2 from the external device or a command of the external device.

Figures 17, 18:
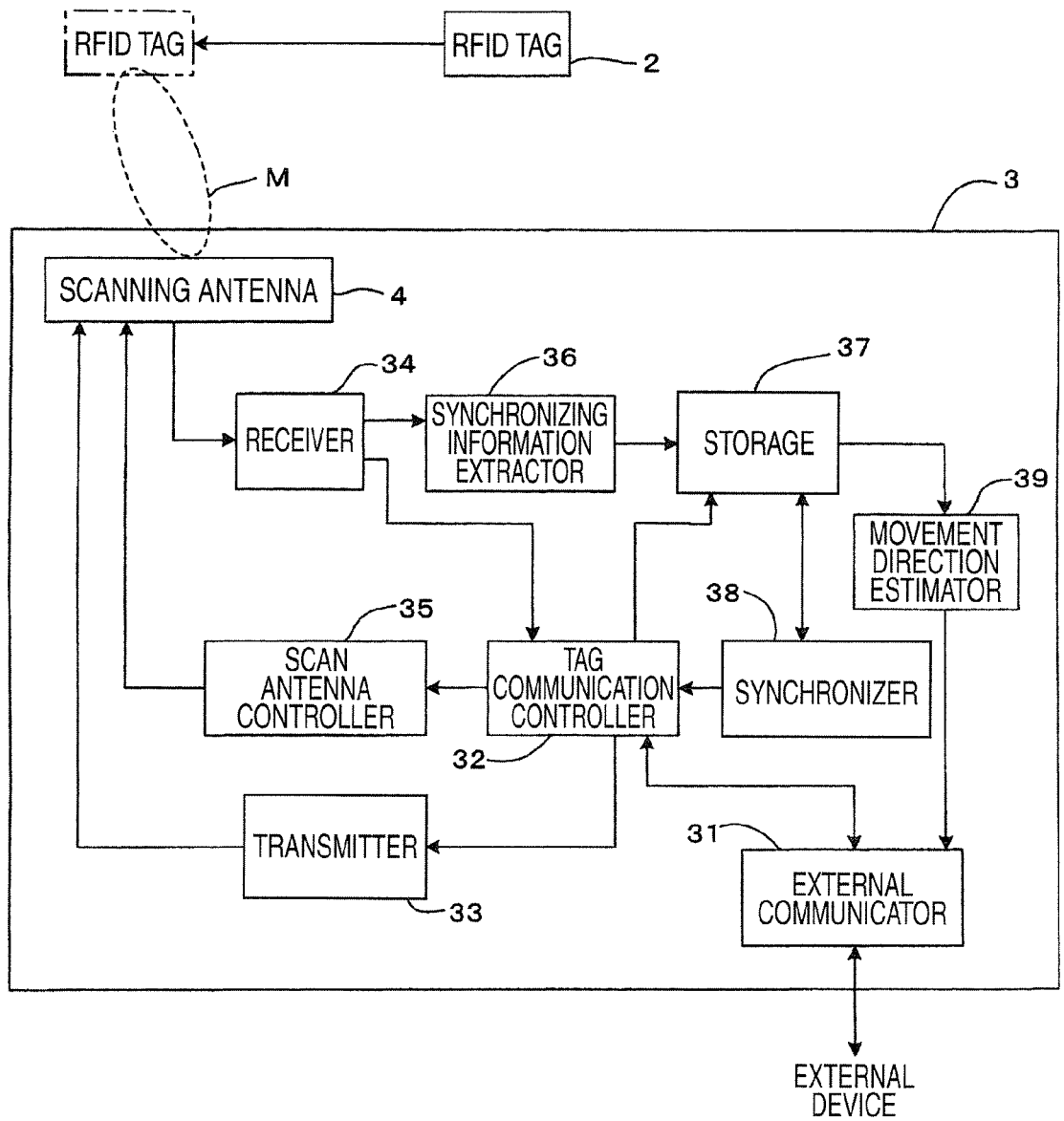
FIG. 17 is a block diagram illustrating an overall configuration a reader/writer according to the fourth embodiment.
FIG. 18 shows a scanning pattern table used in the method of FIG. 16.

A scanning pattern table T1 shown in FIG. 18 is stored in a tag communication controller 32. The scanning pattern table T1 includes data for defining electric power and phases of the antenna elements 40A to 40C of the scan antenna 4. The electric power and the phase defined about the antenna elements 40A to 40C are electrically set to generate the scanning pattern of the scan antenna 4.

That is, the scan angles of the scan antenna 4 are set from the scanning pattern table T1. As shown in FIG. 5, the scan angle refers to a gradient angle of the beam M measured on the basis of a broadside direction BS (which is a direction perpendicular to a direction that the antenna elements 40A, 40B, . . . , 40K are arrayed). Here, a right direction ($\alpha$) of the drawing is referred to as a positive value and a left direction ($\beta$) of the drawing is referred to as a negative value. The scanning pattern table T1 serves as involving the scan angles of $\alpha=+20°$ and $\beta=-40°$ with the table No. The table No. (0 and 1) represents a vertical axis of a movement direction estimating graph G described below.

The tag communication controller 32 reads the scan angle information from the scan table T1 and transmits the scan angle information to a scan antenna controller 35. In this case, as the scan angle information, the scan angles of $\alpha=+20°$ and $\beta=-40°$ are set in the scanning pattern table T1. Accordingly, the tag communication controller 32 repeats sequential transmission of the scan angles of +20° and −40° to the scan antenna controller 35. The tag communication controller 32 receives the ID which the scan antenna 4 has acquired from the RFID tag 2, involves the ID with the scan angle (+20° or −40°) of the scan antenna 4 upon scanning this ID, and then transmits them to the storage 37. The scan angles are not limited to two scan angles of +20° and −40°, but scan angles may be set arbitrarily.

Figure 19:
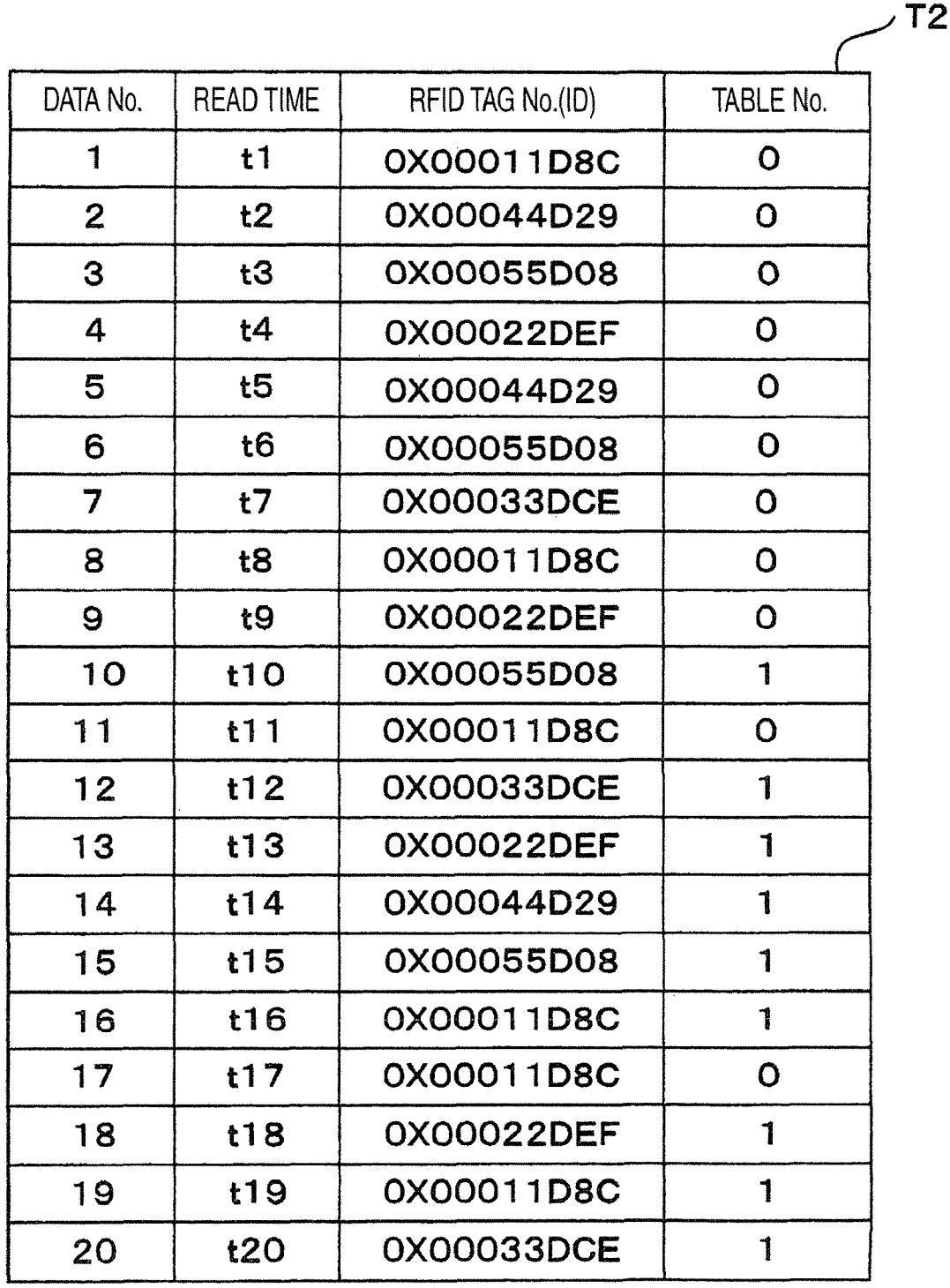
FIG. 19 shows a measured data table used in the method of FIG. 16.

The storage 37 records the ID of the RFID tag 2 and the scan angles (+20° and −40°) which have been associated with each other and have been transmitted from the tag communication controller 32 in a measurement data table T2 shown in FIG. 19. The storage 37 transmits the recorded ID of the RFID tag 2 and the scan angle information to the movement direction estimator 39. The measurement data table T2 includes data No., read time, RFID tag No., and table No. In addition, the IDs of the RFID tag 2 read from the scan antenna 4 are sequentially recorded. The data No. indicates a sequence of the read IDs of the RFID tag 2. The read time indicates time at which the IDs of the RFID tag 2 are read and is recorded by using a clock of the storage 37. In this embodiment, the data No. is recorded in the measurement data table T2. However, since the read sequence can be determined by using only the read time, the invention may be applied to an embodiment in which the data No. is not recorded in the measurement data table T2.

The RFID tag No. is an ID read from the storage 214 of the RFID tag 2 by the scan antenna 4. The table No. is set so as to correspond to each of the scan angles of +20° and −40° in the scanning pattern table T1 and represents a vertical axis of the movement direction estimating graph G described below. FIG. 19 shows a case where a plurality of the articles 5 are being conveyed and the IDs are read from a plurality of the RFID tag 2. For example, the RFID tag 2 of which the RFID tag No. is "0X00011D8C" is read when a direction of the beam M of the radio wave radiated from the scan antenna 4 is the scan angle of +20° and, the data No. "1" is initially read in a reading operation described below.

The movement direction estimator 39 receives information about the data No., the ID, the table No., and the like recorded in the measurement data table T2. In addition, the movement direction estimator 39 performs a movement direction estimating described below from the received information and transmits the calculated movement information and ID to the external communicator 31.

<Scanning Operation>

Figure 20A:
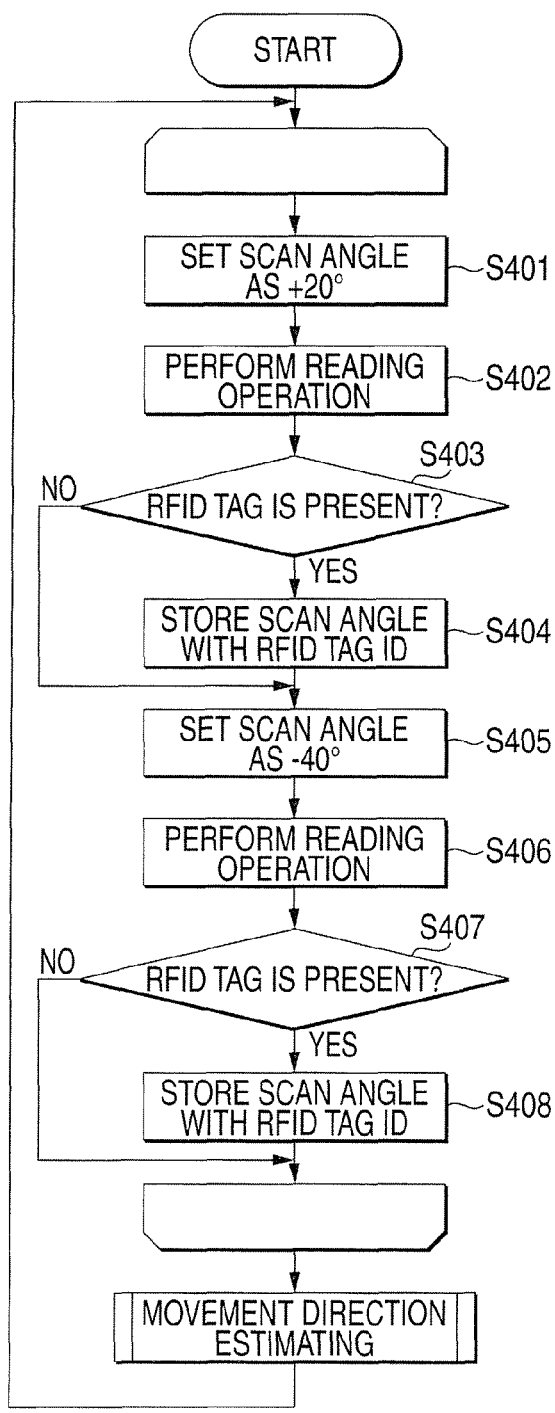
FIG. 20A is a flowchart illustrating a scanning operation of the scan antenna performed in the method of FIG. 16.
Figure 20B:
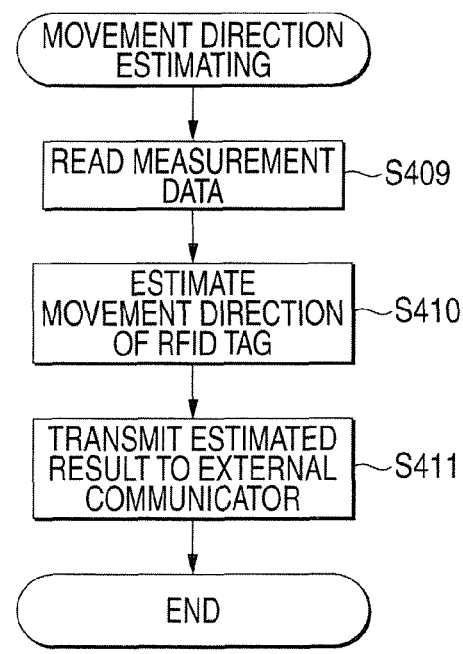
FIG. 20B is a flowchart illustrating a movement direction estimating performed in the method of FIG. 16.

Next, an operation of the RFID communication system configured in this manner will be described with reference to FIGS. 20A and 20B. An overall operation of the RFID communication system is performed in such a manner that the scanning operation is first performed to scan the scan antenna 4, the movement direction estimating is performed on the basis of the scan result, and a movement direction of the RFID tag 2 is detected. Hereinafter, the operation of the RFID communication system will be described in detail.

The scanning operation starts when the tag communication controller 32 receives transmission command information transmitted from an external device through the external communicator 31. When the scanning operation starts, the tag communication controller 32 transmits scan angle information to the scan antenna 4 on the basis of the scanning pattern table T1. In this embodiment, as the scan angle, two angles of +20° and −40° are used.

Specifically, when as the scan angle information, the scan angle of +20° is transmitted from the tag communication controller 32 to the scan antenna controller 35 (S401), the scan antenna controller 35 transmits a scan control signal to the scan antenna 4 so that the beam M of the radio wave transmitted from the scan antenna 4 is radiated in a direction of the scan angle of +20°, and then the scan antenna 4 which receives the scan control signal performs a reading operation of radiating the beam M toward the scan angle of +20° (S402).

From the result of the reading operation, it is checked whether the RFID tag 2 is present. That is, it is checked whether the ID is read from the RFID tag 2 (S403). If it is checked that the RFID tag 2 is present (Y in S403), the ID and the scan angle information (the scan angle of +20°) are associated with each other and recorded along with the data No. in the measurement data table T2 (S404). Subsequently, the scan angle is switched to the scan angle of −40°. The same is applied to the scan angle of −40°, and the same operations are repeated for a prescribed time period. Afterward, the movement direction estimating is performed.

Alternatively, if it is checked that the RFID tag 2 is not present, that is, the information received from the RFID tag 2 is not present from the result of the reading operation, or a signal cannot be normally received from the RFID tag 2 (N in S403), the scan angle information is switched to the angle of −40°, and the same operations as those (S401 to S404) are performed (S405 to S408). After such operations are repeated, the next movement direction estimating is performed to detect the movement direction of the article 5. Time switched from the scanning operation to the movement direction estimating may be determined by the record number of the IDs such as the time of recording an initial ID to twentieth ID in the measurement data table T2. Alternatively, the switched time may be determined by an elapsed time period such as an elapsed time period when is recorded from the time the initial ID and 150 msec elapses. Alternatively, the switched time may be set in the storage 37 beforehand or may be received as a command transmitted from an external device such as a PC.

The scanning operation and the movement direction estimating are executed in parallel in order to attain high-speed processing. In addition, even though the movement direction estimating is performed, the scanning operation can be repeated. However, the scanning operation and the movement direction estimating may be sequentially performed.

<Movement Direction Estimating>

When a prescribed time period elapses or a prescribed number of operations is performed after the initial ID in the measurement table T2 is recorded by the scanning operation, the movement direction estimating starts and the measurement data table T2 recorded in the storage 37 by the movement direction estimator 39 is read (S410). In addition, the read measurement data table T2 is temporarily stored in a buffer and a movement direction estimating is performed on the basis of the information of the stored measurement data table T2 (S411).

Figure 21A:
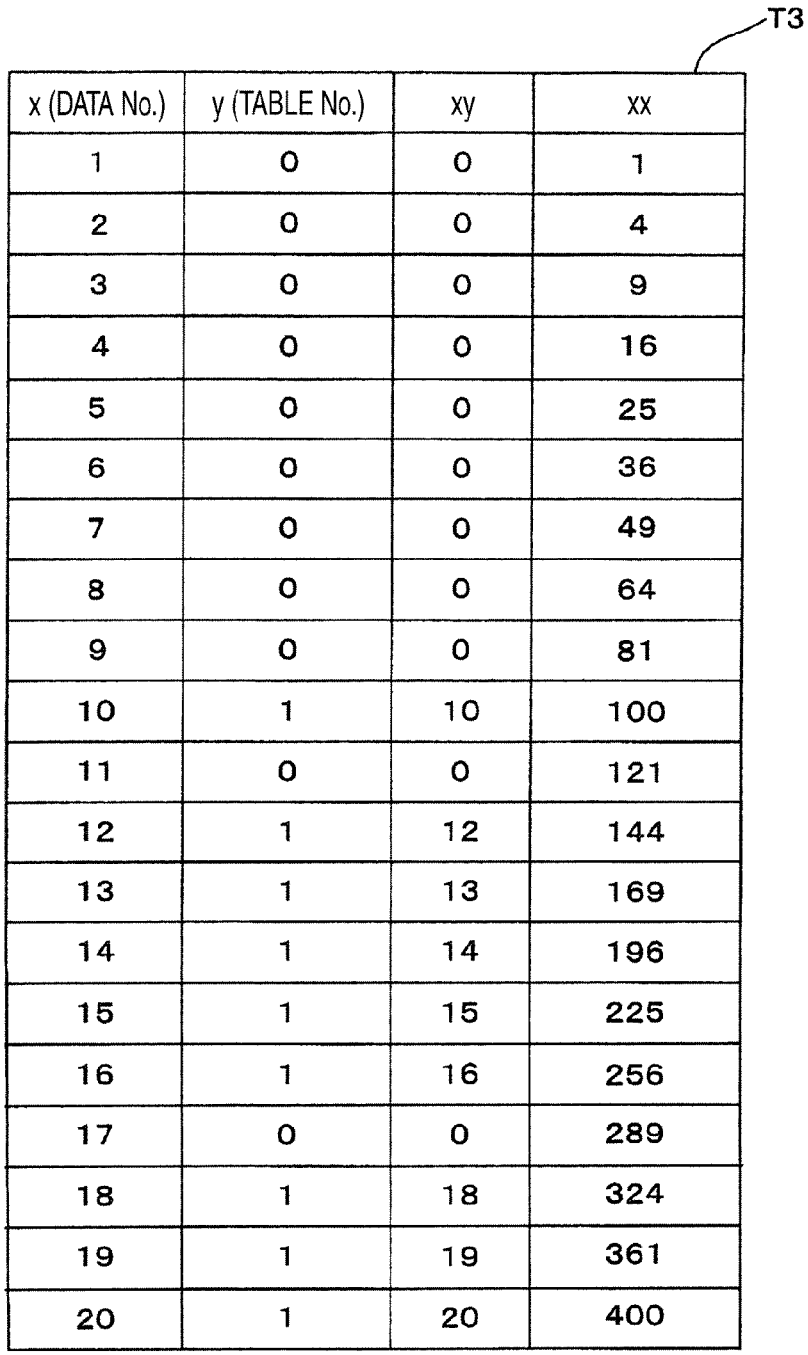
FIGS. 21A and 21B show moving direction estimating tables used in the method of FIG. 16.

The movement direction estimating is performed in the following manner. A first movement direction estimating table T3 shown in FIG. 21A is created on the basis of the data No. and the table No. of the information read from the measurement data table T2. The movement direction estimating table T3 includes x (data No.), y (table No.), a multiplication value xy, and a square value xx. In addition, a second movement direction estimating table T4 is created using the first movement direction estimating table T3.

The second movement direction estimating table T4 includes Σx which is a sum from a first row (data No. 1) to a twentieth row (data No. 20) of x, Σy which is a sum from a first row to a twentieth row of y, Σxy which is a sum from a first row to a twentieth row of xy, 20Σxy which is a product of 20 as the last data No. of x and Σxy, Σxx which is a sum from a first row to a twentieth row of xx, and 20Σxx which is a product 20 as the last row data No. of x and Σxx.

Figure 21B:
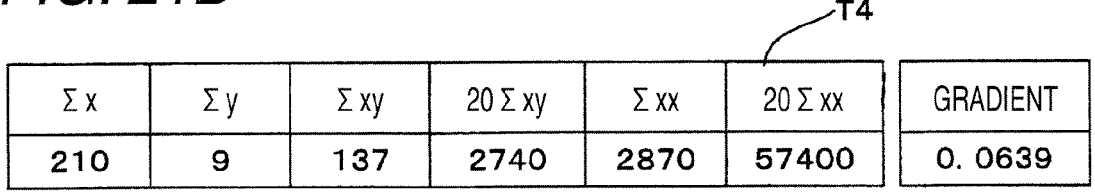

When values of the second movement direction estimating table 4 are substituted in the following equation, a gradient S of 0.0639 shown in FIG. 21B is calculated.

$$S=(\Sigma x\Sigma y-N\Sigma xy)/(\Sigma x\Sigma x-N\Sigma xx)$$

In this embodiment, the data No. from 1 to 20, that is, each of the reader/writers 3 has read the IDs 20 times from the RFID tag 2. However, the gradient S may be calculated by changing N in the above equation in accordance with the read number of times.

In this case, calculating the gradient S means that the movement direction estimating graph G shown in FIG. 22 is generated, the linear approximation line L is obtained from the movement direction estimating graph G, and the gradient of the obtained linear approximation line L is obtained. Specifically, the movement direction estimating graph G is created by plotting each x value and each y value of the movement direction estimating table T3 in an xy coordinate system. In the xy coordinate system, y which represents the table No. and x which represents the data No. are set to a vertical axis and a horizontal axis, respectively. In addition, the linear approximation line L is obtained from the movement direction estimating graph G, and the gradient of the linear approximation line L is calculated.

When the gradient of the linear approximation line L shown in FIG. 22 is inclined right upward in FIG. 10, the gradient S becomes a positive value. Alternatively, when the gradient thereof is inclined left downward, the gradient S becomes a negative value. Alternatively, when the gradient thereof is horizontal, the gradient S becomes zero. In addition, if it is defined that the article 5 is moved in the direction A in FIG. 16B in a case where the gradient S is positive, the article 5 is moved in the direction B in FIG. 16B in a case where the gradient S is negative. In addition, if the article 5 is stopped in a case where the gradient S is zero, it is possible to detect the movement of the article 5 by calculating the gradient S.

When the movement direction estimating is performed in this manner and the movement direction is detected, the calculated movement direction is notified from the movement direction estimator 39 to an external device through the external communicator 31 (S412), and then the movement direction estimating ends.

If movement direction information, that is, the gradient S obtained by the movement direction estimating is a negative value, a positive value, or a zero value, the gradient S is converted into, for example, 01, 10, and 00, respectively. The information of the converted gradients 01, 10, and 00 is associated with the IDs of the RFID tag 2 of the measurement data table T2 temporarily stored in the movement direction estimator 39, and the associated IDs are transmitted to an external device through the external communicator 31.

Accordingly, the external device can detect which article 6 is being moved in which direction. In addition, the movement direction estimating is performed by both the reader/writers 3A and 3B, and the movement direction estimating result is transmitted to the external device. In this manner, since the movement direction estimating is performed by both the opposing reader/writers 3A and 3B in the tag communication system, it is possible to reduce workload in an external device. As described above, it is possible to prevent reading failure generated in a case where the reader/writer 3 is not disposed in one of the right and left sides of the dock door 1, that is, in a case where an object through which a radio wave passes in the article 5 and the RFID tag 2 is attached to the opposite side of the reader/writer 3.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

What is claimed is:

1. A first tag communication apparatus, adapted to perform radio communications with a second tag communication apparatus and an RFID tag provided on a moving object, the first tag communication apparatus comprising:
   an antenna;
   a controller, operable to cause the antenna to transmit first radio waves while changing a first direction that the first radio waves are transmitted;
   a receiver, operable to receive a second radio waves transmitted from the second tag communication apparatus and to receive a tag information transmitted from the RFID tag in response to the first radio waves transmitted from the antenna;
   an extractor, operable to extract, from the second radio waves, synchronizing information indicative of a timing that the second tag communication apparatus changes a second direction that the second radio waves are transmitted therefrom;
   a synchronizer, operable to synchronize a timing that the controller changes the first direction with the timing that the second tag communication apparatus changes the second direction, based on the synchronizing information; and
   a generator, operable to associate the tag information with temporal information indicative of when the receiver receives the tag information, and to generate a plurality of data sets including the temporal information and angle information which is indicative of the direction that the first radio waves are transmitted when the receiver receives the tag information.

2. The first tag communication apparatus as set forth in claim 1, wherein the extractor is operable to extract the synchronizing information from a reception level of the second radio waves.

3. The first tag communication apparatus as set forth in claim 2, wherein the extractor is operable to extract the synchronizing information from a temporal variation of the reception level of the second radio waves.

4. The first tag communication apparatus as set forth in claim 1, wherein the extractor is operable to extract the synchronizing information from data transmitted from the second tag communication apparatus.

5. The first tag communication apparatus as set forth in claim 1, wherein
   the first tag communication apparatus further comprises:
   an estimator, operable to perform linear approximation with respect to a relationship between the temporal information and the angle information, and to estimate a direction that the moving object moves from a gradient of a line obtained by the linear approximation.

6. A tag communication system, adapted to perform radio communications with an RFID tag provided on a moving object, the tag communication system comprising:
   a pair of tag communication apparatuses, disposed so as to oppose each other, each of which is adapted to perform radio communications with the RFID tag and comprises:
   an antenna;

a controller, operable to cause the antenna to transmit radio waves while changing a direction that the radio waves are transmitted;

a receiver, operable to receive a tag information transmitted from the RFID tag in response to the radio waves transmitted from the antenna;

a generator, operable to associate the tag information with temporal information indicative of when the receiver receives the tag information, and to generate a plurality of data sets including the temporal information and angle information which is indicative of the direction that the radio waves are transmitted when the receiver receives the tag information; and an estimator, operable to perform linear approximation with respect to a relationship between the temporal information and the angle information, and to estimate a direction that the moving object moves from a gradient of a line obtained by the linear approximation.

* * * * *